US011754387B2

(12) United States Patent
Shepherd et al.

(10) Patent No.: US 11,754,387 B2
(45) Date of Patent: Sep. 12, 2023

(54) NONCONTACT SENSOR CALIBRATION USING SINGLE AXIS MOVEMENT

(71) Applicant: GLEASON METROLOGY SYSTEMS CORPORATION, Dayton, OH (US)

(72) Inventors: Ethan James Shepherd, West Carrollton, OH (US); Parag P. Wagaj, Springboro, OH (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 199 days.

(21) Appl. No.: 17/310,687

(22) PCT Filed: Mar. 6, 2020

(86) PCT No.: PCT/US2020/021303
§ 371 (c)(1),
(2) Date: Aug. 18, 2021

(87) PCT Pub. No.: WO2020/185531
PCT Pub. Date: Sep. 17, 2020

(65) Prior Publication Data
US 2022/0074732 A1 Mar. 10, 2022

Related U.S. Application Data

(60) Provisional application No. 62/815,565, filed on Mar. 8, 2019.

(51) Int. Cl.
*G01B 11/00* (2006.01)
*G01B 21/04* (2006.01)

(52) U.S. Cl.
CPC .......... *G01B 11/005* (2013.01); *G01B 21/042* (2013.01)

(58) Field of Classification Search
CPC .................................................. G01B 21/042
(Continued)

(56) References Cited

U.S. PATENT DOCUMENTS

| 7,055,367 B2* | 6/2006 | Hajdukiewicz | ...... G01B 21/042 |
| | | | 702/155 |
| 7,712,224 B2* | 5/2010 | Hicks | ................... G01B 21/045 |
| | | | 33/502 |

(Continued)

FOREIGN PATENT DOCUMENTS

| CN | 107741198 A | 2/2018 |
| DE | 19733711 A1 | 2/1999 |

OTHER PUBLICATIONS

G. Schick, "Metrology CT Technology and its Applications in the Precision Engineering Industry", Fourth International Conference on Experimental Mechanics, SPIE, vol. 7522, May 7, 2010, pp. 75223S-1 to 75223S-4.

(Continued)

*Primary Examiner* — George B Bennett
(74) *Attorney, Agent, or Firm* — Robert L. McDowell

(57) ABSTRACT

A probe calibration method and calibration artifact (30, 70) whereby calibration can be performed without the use of machine axes capable of three dimensional positioning of a probe relative to a calibration sphere (40). The method includes a plurality of calibration spheres fixed in relation to one another via a rigid structure comprising a calibration artifact body (30, 70). The spheres are mounted such that each will be sensed by the probe at some position of a machine axis (W, N). In other words, the spheres lie in the region swept out by the sensor field of view (8, 78) over the movement of the machine axis. The calibration spheres are located at known positions (A, B, C) and the calibration
(Continued)

artifact body is designed such that it may be mounted in a known location in place of a work piece.

20 Claims, 25 Drawing Sheets

(58) Field of Classification Search
USPC .................................................. 33/502, 503
See application file for complete search history.

(56) References Cited

U.S. PATENT DOCUMENTS

| | | | | |
|---|---|---|---|---|
| 7,900,367 | B2 * | 3/2011 | Sutherland | G01B 21/042 |
| | | | | 33/502 |
| 7,908,756 | B2 * | 3/2011 | Clifford | G01B 21/042 |
| | | | | 33/502 |
| 10,323,927 | B2 * | 6/2019 | Stigwall | G01B 5/0014 |
| 10,401,162 | B2 * | 9/2019 | Lummes | G05B 19/401 |
| 11,231,273 | B2 * | 1/2022 | Meuret | G01B 21/042 |
| 11,402,201 | B2 * | 8/2022 | Rees | G01B 5/008 |
| 11,585,766 | B2 * | 2/2023 | Nikolskiy | A61B 6/14 |
| 2022/0221261 | A1 * | 7/2022 | Asanuma | G01B 5/008 |
| 2023/0051393 | A1 * | 2/2023 | Hunter | G01B 5/0004 |

OTHER PUBLICATIONS

Moroni, Giovanni et al., "Four-Axis Micro Measuring Systems Performance", CIRP Annals—Manufacturing Technology, vol. 63, No. 1, Apr. 4, 2014, pp. 485-488, Elsevier.

Feng, Li et al., "A Practical Coordinate Unification Method for Integrated Tactile-Optical Measuring Systems", Optics and Lasers in Engineering, Elsevier, vol. 55, Apr. 1, 2014, pp. 189-196, Elsevier.

Wen-Long, Li et al., "A New Calibration Method Between an Optical Sensor and a Rotating Platform in Turbine Blade Inspection", Measurement Science and Technology, IOP Publishing, Bristol, GB, vol. 28, No. 3, Feb. 2, 2017, pp. 1-9.

International Search Report and Written Opinoin for PCT/US2020/021303, ISA/EPO, dated Jun. 12, 2020, 14 pgs.

* cited by examiner

NONCONTACT SENSOR CALIBRATION USING SINGLE AXIS MOVEMENT

FIELD OF THE INVENTION

The present invention relates to the calibration of non-contact sensors for inspecting workpieces including gears and other toothed articles, particularly on functional measurement platforms that produce analytical test results. The invention uses single axis movement for calibration.

BACKGROUND OF THE INVENTION

For many years analytical testing of gears has been done using a CMM (Coordinate Measurement Machine) or a GMM (Gear Measurement Machines). A typical CMM or GMM utilizes at least one contact probe. In recent years, a non-contact sensor (e.g. laser) has been used to inspect same gears as is disclosed in WO 2018/048872, the disclosure of which is hereby incorporated by reference. Both probing technologies (i.e. contact and non-contact) on these machines utilize a calibration method which usually involves use of a single sphere.

Analytical testing of gears may be done by either a GMM or CMM. These machines include a computer controlled apparatus which includes a high resolution touch sensor (e.g. tactile probe) and/or a non-contact probe. The machine of WO 2018/048872 is an example of an analytical machine for inspecting a gear workpiece utilizing a touch sensor and/or a laser sensor for inspection. Both sensors require calibration before inspecting gears.

CMM and GMM machines are both equipped with probes capable of measuring the location of points on the surface of workpieces. This is one of the core functions of these machines and is used to implement the full range of functionality available on these machines (e.g. measuring size, location, deviation from theoretical surface and form of geometric shapes). These measurements are checked against certain tolerances to ensure the correct fit and function of the measured workpieces.

To measure a workpiece, the machine must convert the signal output from its probe (or probes) and the respective position of the relevant machine axes into the location of points on the surface of a workpiece. This is often implemented as a mathematical function or model which utilized a probe signal as an output and machine data as an input. The model is ultimately used to output the location of points on the surface of a workpiece. This model uses parameters which account for assembly and manufacturing variability in the probe and machine (e.g. probe orientation, offset, and scale factors). These parameters are often referred to as probe calibration parameters (or coefficients). Determining these parameters accurately is critical to the operation of the machine. The process of determining these parameters is known as the probe calibration.

CMM and GMM machines equipped with a tactile probe typically use a single sphere (known as the calibration sphere) as a reference for determining the probe calibration parameters. See the machine 1 of FIG. 1 for example. During the probe calibration the machine axes (X, Y, Z, P) move to touch the probe tip 2 to the calibration sphere 4 in multiple locations with several probe deflections. The probe tip calibration parameters are computed to a high degree of accuracy using the data (probe deflection signal, axis positions) collected during this process.

CMM and GMM machines equipped with a non-contact two-dimensional (2D) profile sensor (e.g. laser) 6 utilize a method similar to tactile probe calibration. See the machine 3 of FIG. 2 for example. Such a machine typically uses a single sphere 4 (known as the calibration sphere) as a reference for determining probe location, orientation, and scale. These parameters (probe location, orientation, and scale coefficients) are referred to as the probe calibration parameters and the parameters are critical to converting the data output by the probe (a list of depth measurements across the field of view of the sensor) into accurate three-dimensional (3D) point-cloud data which is needed to perform measurements. The process of determining these parameters is known as probe calibration.

During the probe calibration process, the machine axes (X, Y, Z, P) move the probe so that its field of view 8 moves across the sphere. The machine performs several such moves, each slightly different such that the sphere 4 occupies a different region in the field of view 8 of the probe 6. For example, FIG. 3 shows the sphere 4 positioned in the upper-left portion of the field of view 8 with a small portion of the sphere 4 protruding above the field of view. FIG. 4 shows repositioning of the field of view 8 in the Z direction such that a large portion of the sphere 4 protrudes above the field of view. FIG. 5 shows the sphere 4 located in the upper-right portion of the field of view 8 with a small portion of the sphere 4 protruding above the field of view. Compared to FIG. 4, the position of FIG. 5 was reached via movement in the Z and Y directions. Finally, FIG. 6 shows the sphere 4 located in the lower-right portion of the field of view 8 with a small portion of the sphere 4 protruding above the field of view. Compared to FIG. 5, the position of FIG. 6 was reached via movement in the X direction. The probe calibration parameters are computed to a high degree of accuracy using the data (probe data, axis positions) collected during this process.

The method discussed above includes utilization of at least one linear axis to calibrate a non-contact sensor. In order to perform a calibration process the machine must be equipped with linear axes motions which permit such movement to be performed. Without the ability to re-position the probe via the machine axes, the sphere is restricted to a small portion of the probe's field of view. The data (probe data, axis positions) that may be collected with such a restriction is not sufficient to accurately determine the probe calibration parameters.

FIGS. 7, 8 and 9 show a machine 50 comprising at least one non-contact sensor 52 on a functional testing platform for workpiece inspection and/or measurement. The machine, per se, is of the type disclosed in WO 2019/083932 the disclosure of which is hereby incorporated by reference. The machine 50 comprises a production gear 16 (i.e. the workpiece) and master gear 14 mounted on respective workholding arbors 18 and 12, such as mechanical, hydraulic or pneumatic arbors as is known to the skilled artisan. The production gear 16 may be located on either the left hand side or on the right hand side of the master gear 14 but is shown on the left side in FIG. 7. The gear 16 rotates on a motorized axis W. The master gear 14 is mounted on right hand side (axis T) and is not motorized. The rotation of master gear 14 is provided by the driving motor for axis W and the engagement with the production gear 16.

For functional testing, the master gear 14 is on a slide 26 (X axis) and is moveable in the direction of the X axis to allow coupling and decoupling of gears. Decoupling is required so that the production gear 16 can be removed and replaced with different workpieces either manually or via automation means. A linear scale 7 (FIG. 9) is mounted to capture movement of the slide 26 in the X axis direction during operation. A rotary encoder (not shown) is mounted below the motorized production gear 16 (axis W) to capture rotary movement of the workpiece gear. Inputs of the rotary encoder and the linear scale are captured so that during rotation of gear pair, relative movement of gears (in the X direction) is measured with respect to the rotary position of the workpiece gear 16.

As shown in FIG. 7, a non-contact sensor such as a laser assembly 52 is positioned on left side of the machine for analytical testing. A single laser 54 is mounted on a linearly adjustable post 56 having an adjustable mounting mechanism 58 whereby the laser 54 is movable and positionable in up to three linear directions X, Y, Z (preferably mutually perpendicular) and in up to three rotational directions, that is, about each of X, Y and Z for manually setting the operating position of the laser. In other words, laser 54 is preferably capable of six degree-of-freedom movement but only for set-up purposes. Such adjustability is preferable in order to orient the laser line 60 onto a gear tooth space whereby it can capture at least a portion of the tooth involute (i.e. profile direction) from root-to-tip for both tooth flanks of adjacent teeth.

However, the only computer-controlled axis on the machine of FIG. 7 for analytical testing is the workpiece rotational axis W. The machine lacks the ability to reposition the probe via the one or more linear axes. Computer controlled positioning of a workpiece 16 relative to laser 54 in mutually perpendicular directions X, Y and Z (i.e. three dimensional) is not possible and, hence, calibration of laser 54 is not possible using the techniques discussed above.

SUMMARY OF THE INVENTION

The present invention comprises a probe calibration method and calibration artifact whereby calibration can be performed without the use of machine axes capable of three dimensional positioning of a probe relative to a calibration sphere.

The invention comprises a calibration artifact for a machine having a laser sensor with an associated field of view. The calibration artifact is rotatable about an axis of rotation of the machine or linearly translatable in a direction on the machine. The calibration artifact comprises a top side and a plurality of shaped calibration surfaces arranged on at least one surface on the top side of the calibration artifact. The calibration surfaces are arranged at different locations on at least one top side surface with respect to the field of view of said laser sensor.

The inventive method includes a plurality of calibration spheres fixed in relation to one another via a rigid structure comprising a calibration artifact body. The spheres are mounted such that each will be sensed by the probe at some position of a machine axis. In other words, the spheres lie in the region swept out by the sensor field of view over the movement of the machine axis. The calibration spheres are located at known positions and the calibration artifact body is designed such that it may be mounted in a known location in place of a work piece.

DETAILED DESCRIPTION OF THE PREFERRED EMBODIMENT

Figure 1:
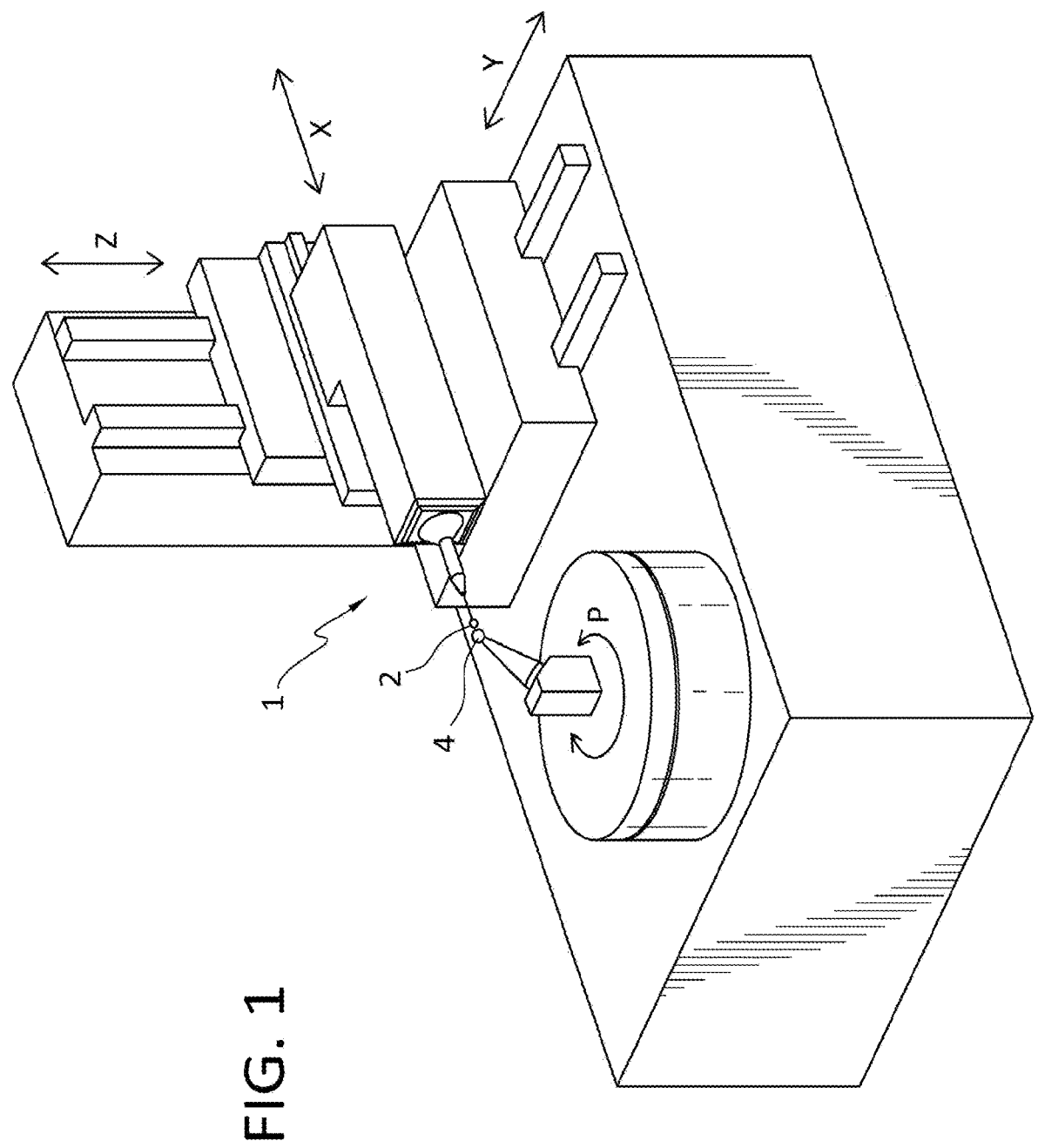
FIG. 1 is a schematic representation of a multi-axis CMM and GMM equipped with a tactile probe and a single sphere (known as the calibration sphere) as a reference for determining the probe calibration parameters.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. The words "a" and "an" are understood to mean "one or more" unless a clear intent to limit to only one is specifically recited. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used to herein for purposes of description and are not intended to indicate or imply importance or significance unless specifically recited.

The invention comprises a machine axis capable of moving a probe and a calibration artifact relative to one another. A preferred embodiment comprises a rotary axis, however a translational axis or (more generally) any axis which positions along a curve with sufficient accuracy may be employed (e.g. linear slide, conveyor, linkage, helical axis, arc, etc.).

Figure 7:
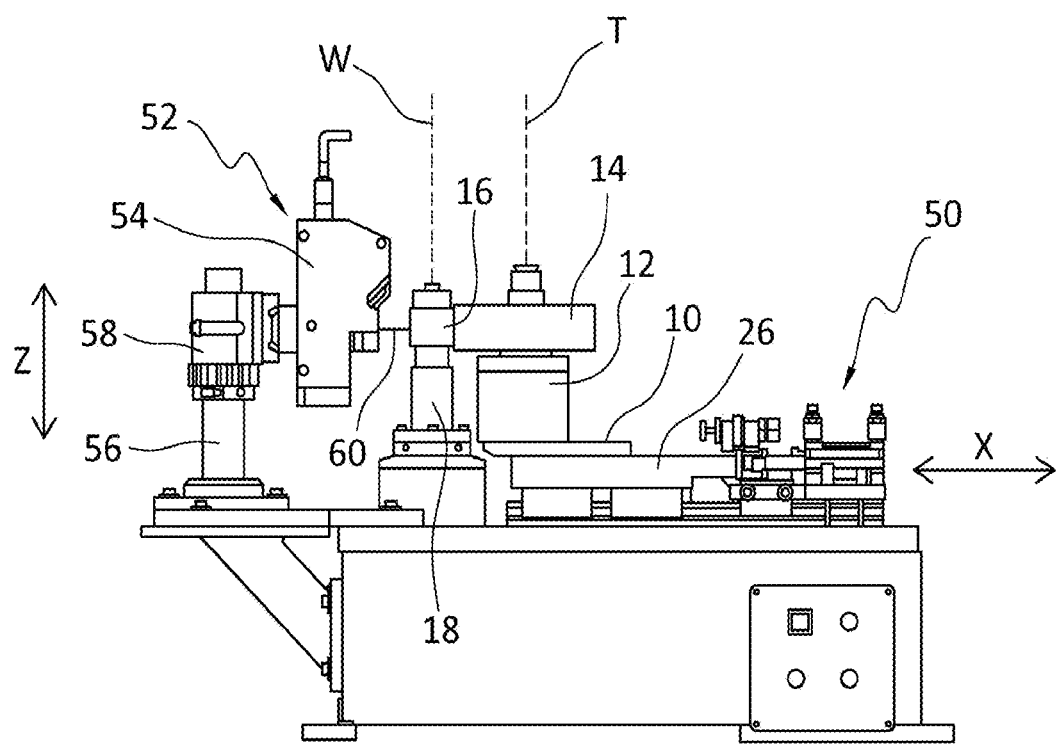
FIG. 7 illustrates a machine comprising at least one non-contact sensor on a functional testing platform for workpiece, particularly gears, inspection and/or measurement.
Figure 8:
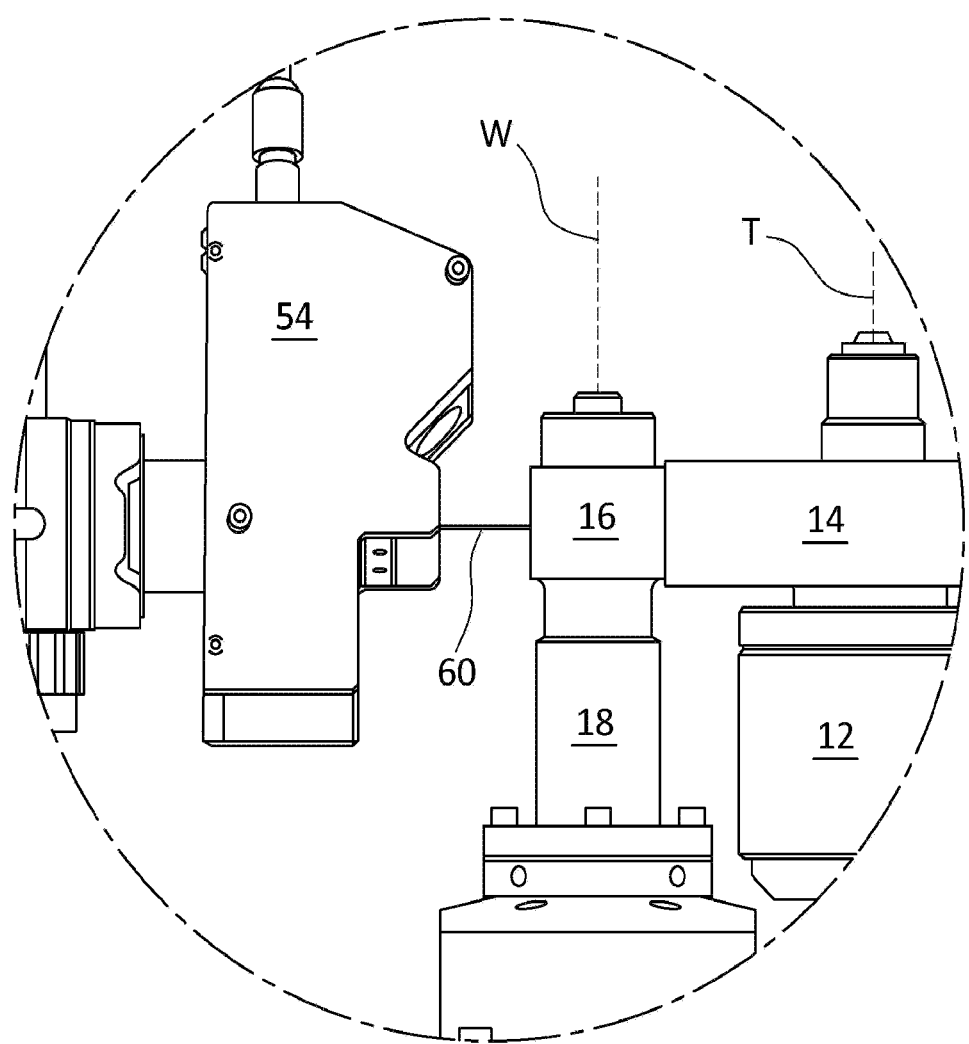
FIG. 8 shows an enlarged view of the non-contact sensor on the machine of FIG. 7.
Figure 9:
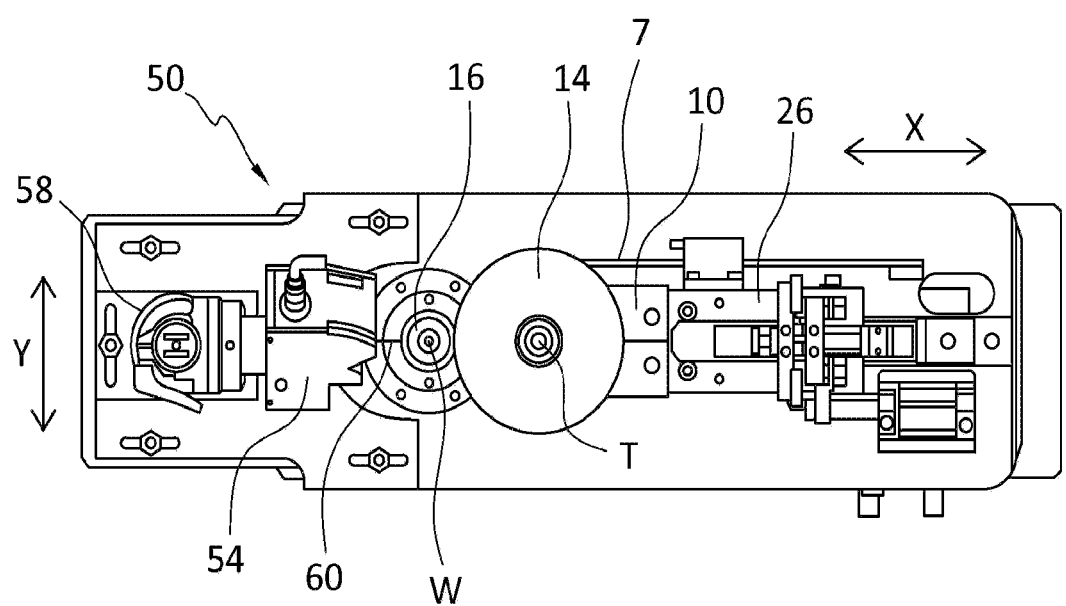
FIG. 9 shows a top view of the machine of FIG. 7.
Figure 10:
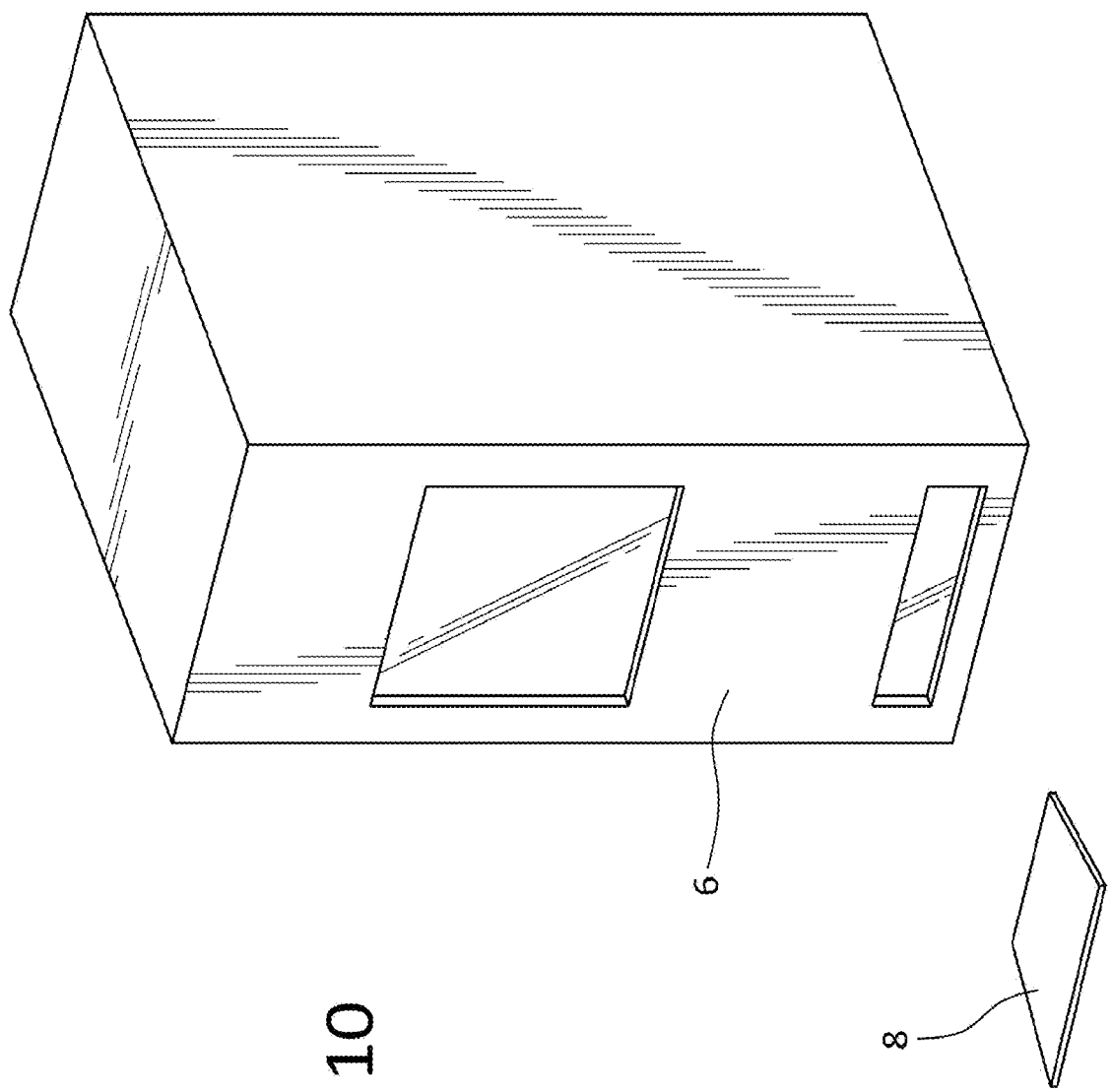
FIG. 10 is an enlarged view of a laser sensor and its associated field of view.
Figure 11:
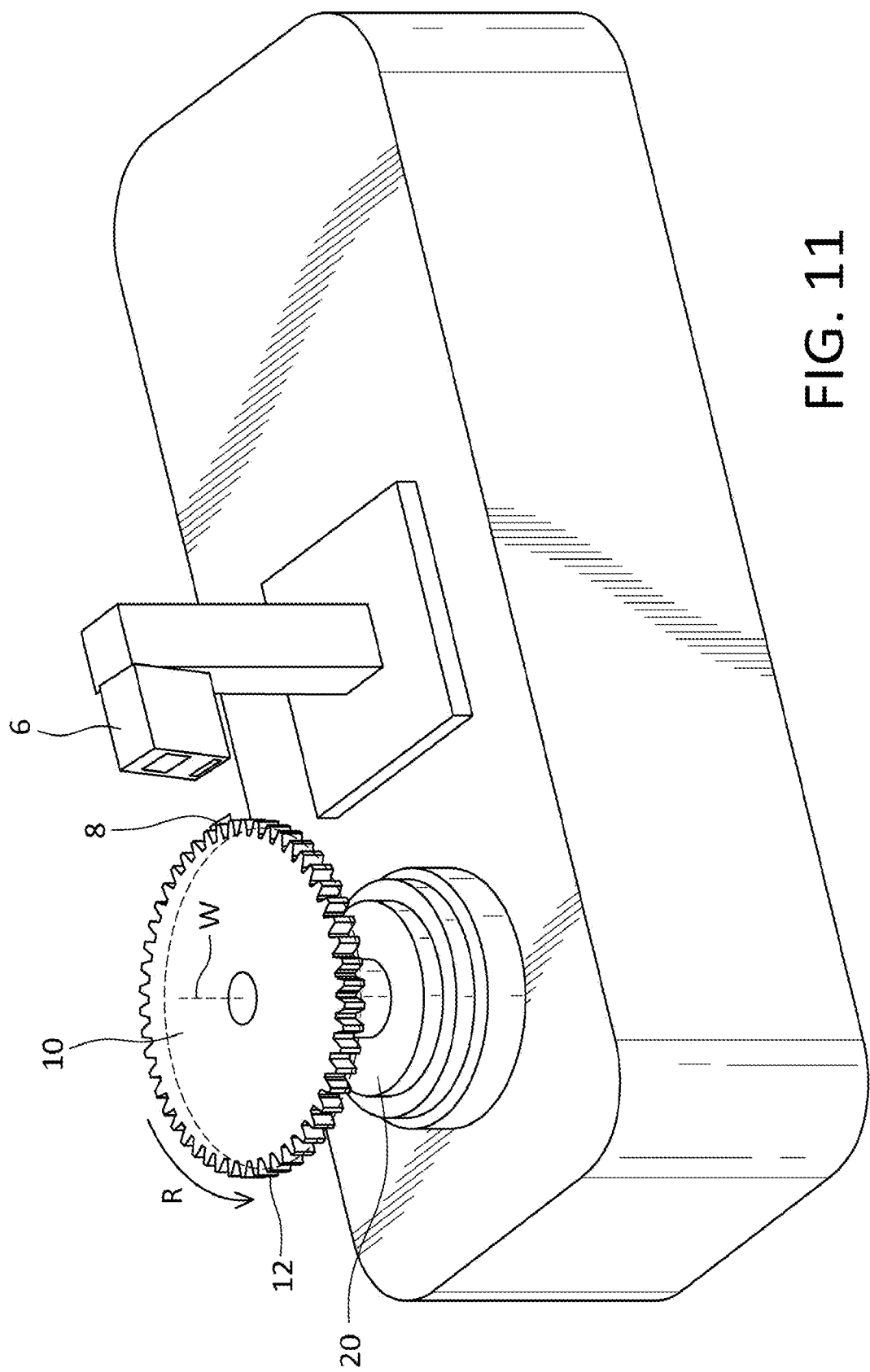
FIG. 11 illustrates a simplified view of an analytical gear testing machine.

FIG. 10 is an enlarged view of a laser sensor 6 and its associated field of view 8 as noted in the embodiments discussed above. FIG. 11 is a simplified view of an analytical testing arrangement as may be found on a machine such as the machine of FIG. 7. In the simplified view of an analytical gear testing machine of FIG. 11, a gear workpiece 11 is rotatable about machine workpiece axis, W, with the teeth 12 of gear 10 passing through the field of view 8 of laser sensor 6 as the gear 10 is rotated in direction R as indicated by the arrow. The laser sensor 6 is slightly tilted so as to provide a vertical component to the field of view 8. The only machine motion available in FIG. 11 is workpiece rotation about the W axis. Similar to FIG. 7, laser sensor 6 is set in a fixed position as is the workpiece spindle 20 of the machine.

The present invention addresses the inability to adequately re-position a probe, particularly a non-contacting sensor such as a laser sensor, with respect to a calibration sphere, or other shaped calibration surfaces, as discussed above, preferably with respect to analytical gear testing machines having a limited number of controlled axes (e.g. one rotational axis).

Figure 12:
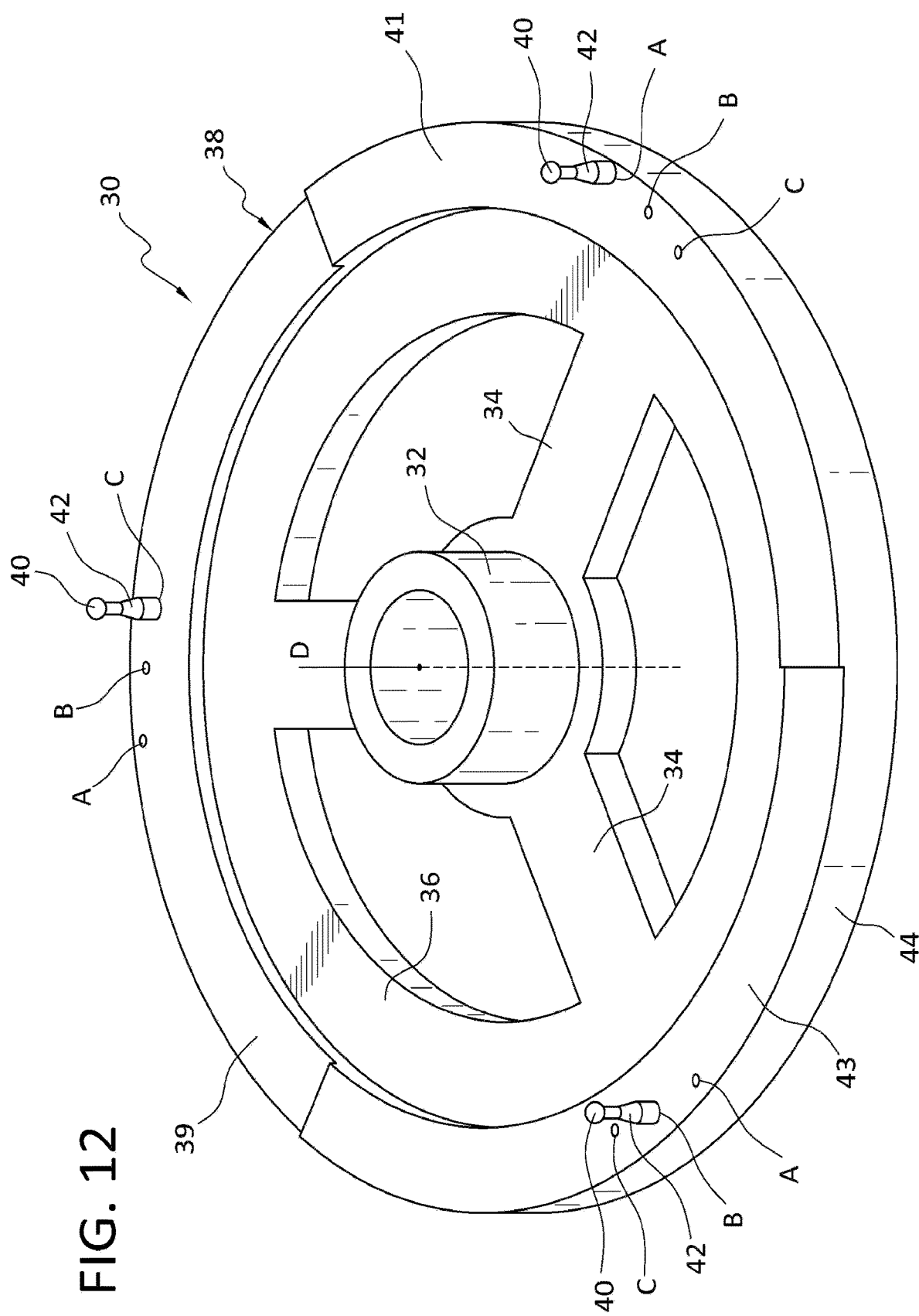
FIG. 12 shows a calibration artifact in accordance with the invention.

FIG. 12 shows a calibration artifact 30 being circular is shape (e.g. generally disk-shaped), having a top side and a bottom side (not shown), and being rotatable about an axis (e.g. axis D). The calibration artifact 30 is capable of being positioned for rotation on a workpiece spindle of a machine such as an analytical gear testing machine. In FIG. 12, the artifact 30 comprises a central hub 32 which is positionable on a workpiece spindle of a machine via appropriate workholding equipment as is well understood by the skilled artisan. Artifact 30 further comprises a plurality of arms 34 (three shown in FIG. 12) extending radially from hub 32 to an outer circumferential portion 36 at least a portion of which comprises a circumferential face portion 38 located on one side (i.e. top side in FIG. 12) of the artifact adjacent to the periphery 44 of the artifact. Face portion 38 preferably comprises a plurality of distinct flat (e.g. ground) surfaces, preferably three flat surfaces 39, 41 and 43, each of which is located at a different axial position relative to one another in the direction of rotational axis D. Of course, other types of structures of the artifact 30 are possible (e.g. solid disk).

The artifact 30 comprises a plurality of calibration spheres 40 (three shown) fixed in relation to one another via a rigid structure 42, such as pins or posts, that are attached, preferably via a threaded connection, to the face portion 38, in particular to flat surfaces 39, 41 and 43, of the artifact 30. The spheres 40 are preferably positioned with respect to one another such that when each sphere is located within the field of view 8 of a laser, each sphere will occupy a location within the field of view that is different than the respective locations of the other spheres of the artifact. For example, in FIG. 12, three groups of threaded/tapped holes marked A, B and C are provided, one group of holes per flat surface 39, 41 and 43, where pins or posts 42 connect to the flat surfaces 39, 41, 43 of the artifact 30.

All locations A are positioned at the same radial distance from the axis D. Likewise, all locations B are positioned at the same radial distance from the axis D and all locations C are positioned at the same radial distance from the axis D. However, the respective radial distances for A, B and C are different from one another. Thus, the radial positions of spheres in each group of A, B and C will not be the same. Furthermore, with "stepped" flat surfaces 39, 41 and 43 each being at a different axial position, each sphere 40 of the artifact 30 will be in different axial position and, hence, will protrude above, or below, the field of view 8 by different amounts as the sphere passes through the field of view. Although three positions A, B and C are preferred, the invention is not limited thereto as more than three are contemplated.

Preferably, the artifact 30 comprises three groups of holes A, B, C spaced about the top surface of the artifact, preferably equidistantly at 120 degree intervals, with preferably one group of holes in each of the "stepped" flat surfaces 39, 41 and 43. Additionally, the radial locations of holes A, B, C preferably coincide with certain locations on a gear corresponding in size. The radial distance to "B" times 2 ($r_B \times 2$) preferably coincides with the pitch diameter (i.e. at the pitch line) of the corresponding gear. Similarly, the radial distance to "A" times 2 ($r_A \times 2$) preferably represents a diameter greater than the pitch diameter of the corresponding gear, and the radial distance to "C" times 2 ($r_C \times 2$) preferably represents a diameter less than the pitch diameter of the corresponding gear. The actual diameter of the artifact is not relevant to the calibration process but the diameter must be such that the artifact does not interfere with the laser 6 or any other machine component.

With the "stepped" configuration (39, 41, 43) of the face portion 38 of the artifact, a single size of sphere 40 and pin/post 42 may be utilized. Preferably, commercially available probe tips comprising a threaded post and sphere are utilized on the artifact. Alternatively, the face portion 38 of the artifact may lie in a single plane and posts of different lengths provided so as to enable spheres of different axial positions.

The spheres 40 are mounted such that each sphere will be sensed by the probe (e.g. laser) as the artifact rotates about the axis, such as the axis of workpiece rotation of the testing machine, and each sphere passes through the field of view 8. See FIG. 13. In other words, the spheres 40 lie in the region swept out by the sensor field of view 8 over the movement of the machine workpiece rotational axis W (which is coincident with axis D when the calibration artifact 30 is positioned on the machine spindle). The calibration spheres 40 are located at known positions either by precise construction or by inspection on a suitable coordinate measuring machine. The body of the calibration artifact is designed such that it may be mounted in a known location in place of a work piece.

Figure 13:
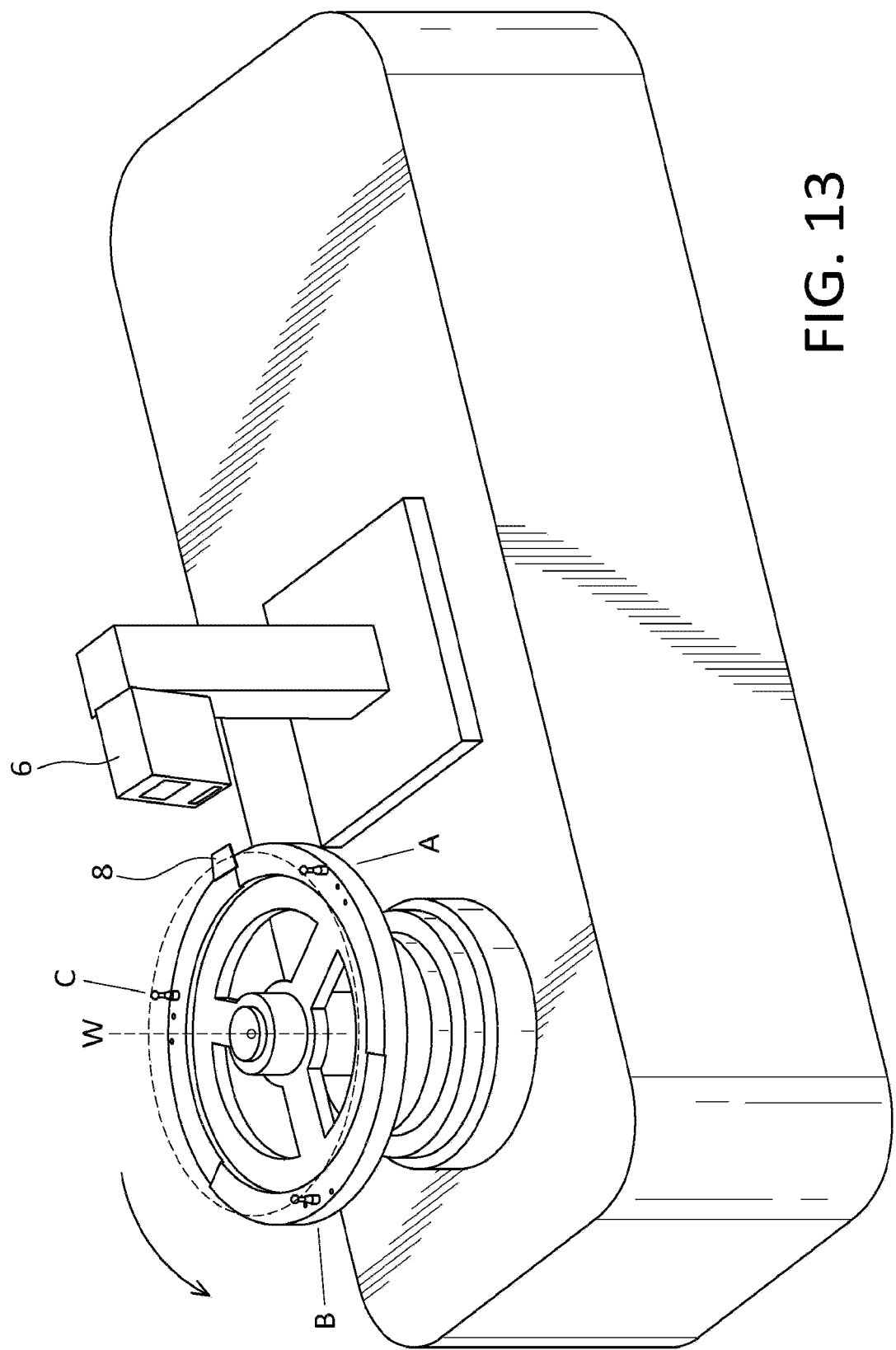
FIG. 13 shows the calibration artifact of FIG. 12 operable on an analytical gear testing machine of the type shown in FIG. 11.
Figure 14:
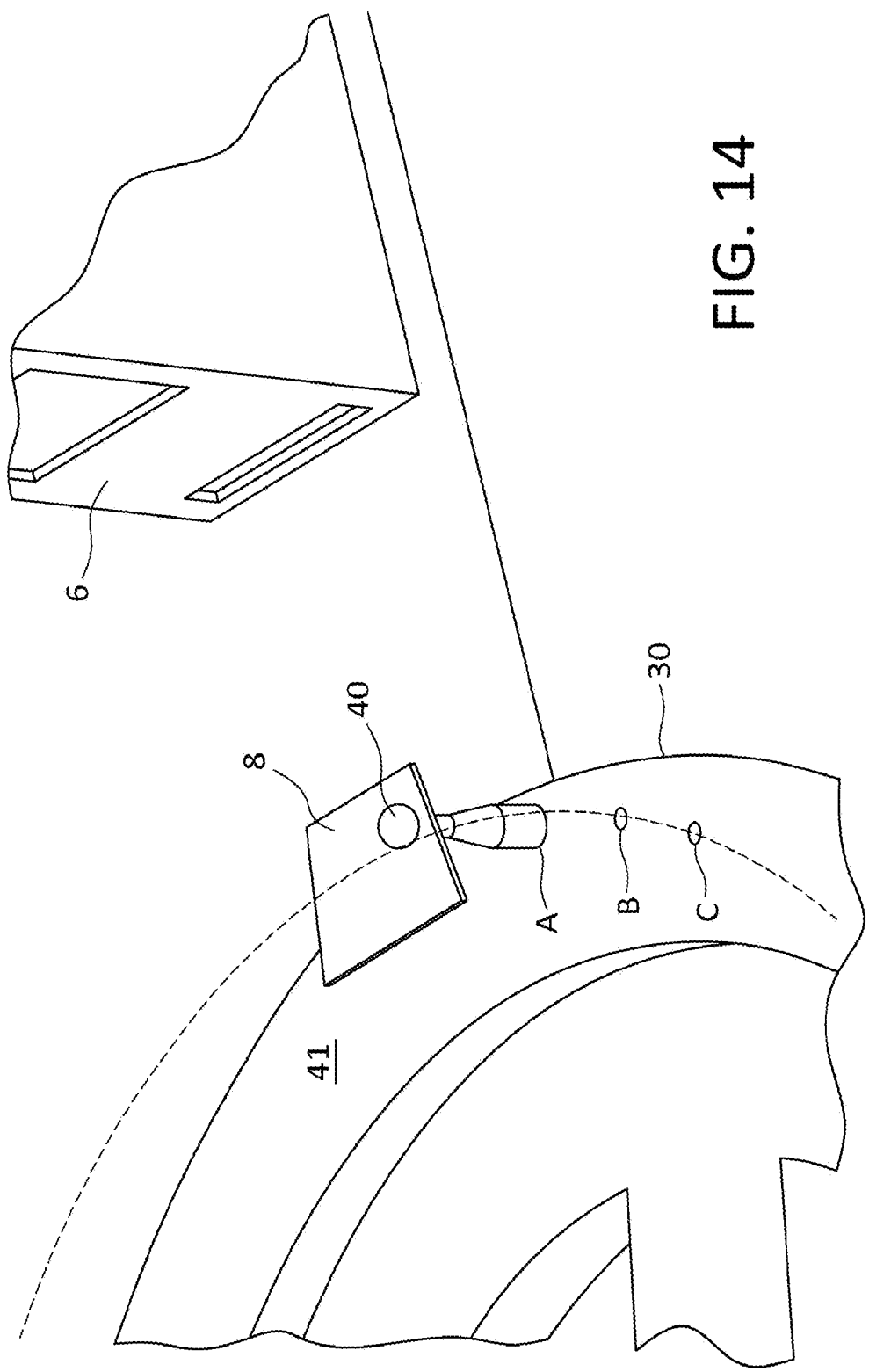
FIG. 14 shows a sphere located at defined position on a calibration artifact as the sphere enters a field of view of a non-contact probe during calibration of the probe.
Figure 15:
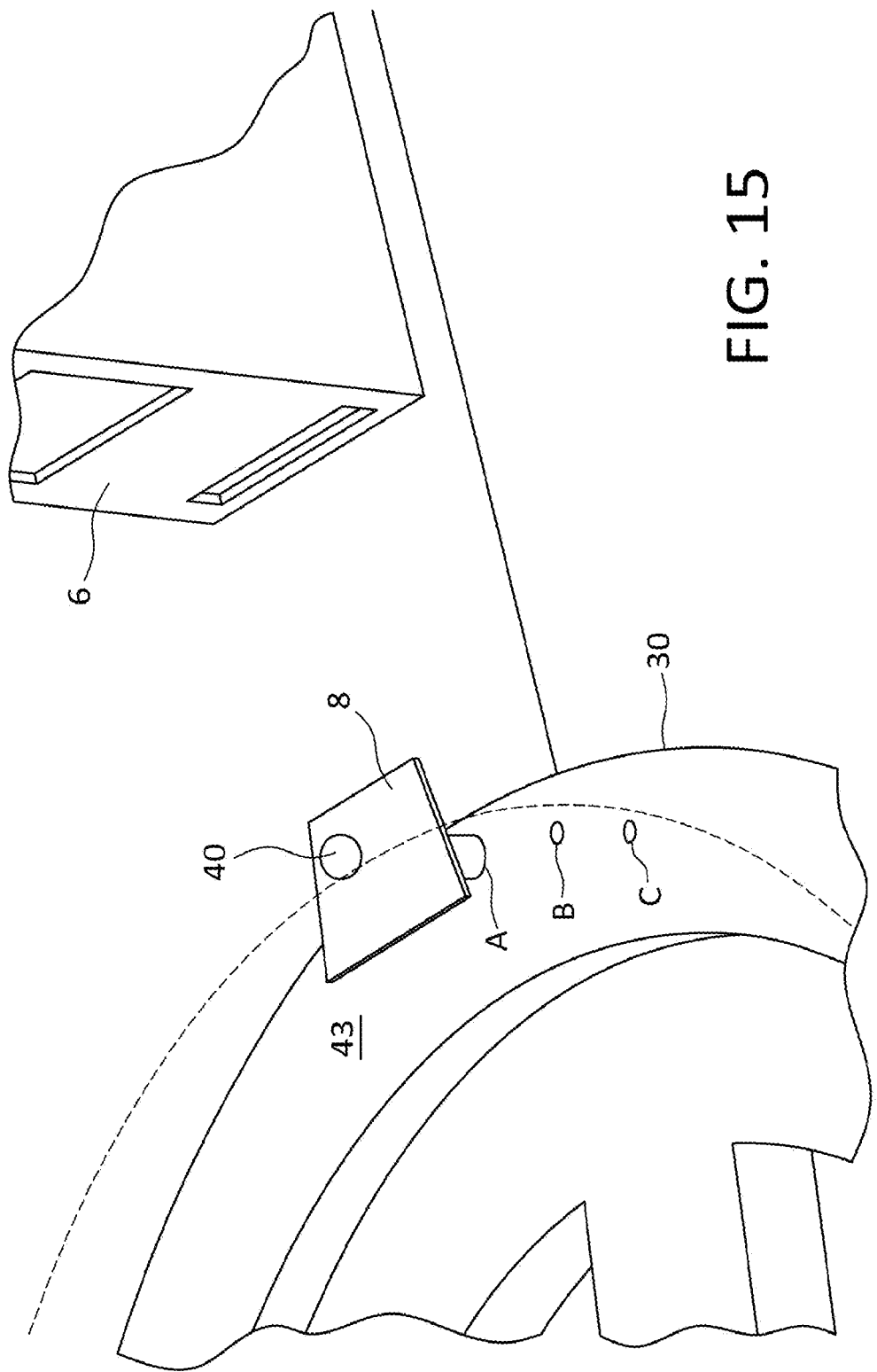
FIG. 15 shows the sphere of FIG. 14 as the sphere is near to leaving the field of view of the non-contact probe during calibration of the probe.

FIGS. 14-19 illustrate examples of utilizing the artifact 30 in the machine calibration process. FIG. 14 shows a sphere 40 located at position A as the sphere enters the field of view 8 which is slightly tilted (see the tilted sensor 6 in FIG. 13). The dashed line represents the plane of the tilted field of view 8. FIG. 15 shows a sphere 40 located at position A that, due to rotation of the artifact 30, is located near the edge of the field of view 8 and is about to leave the field of view as rotation of the artifact about axis W continues. Because of the tilted field of view, the cross-section of the sphere passing through the field of view decreases as the sphere moves from entry to exit in the field of view 8. Note the amount of sphere 40 protruding above the field view 8 in FIG. 14 and FIG. 15.

Figure 16:
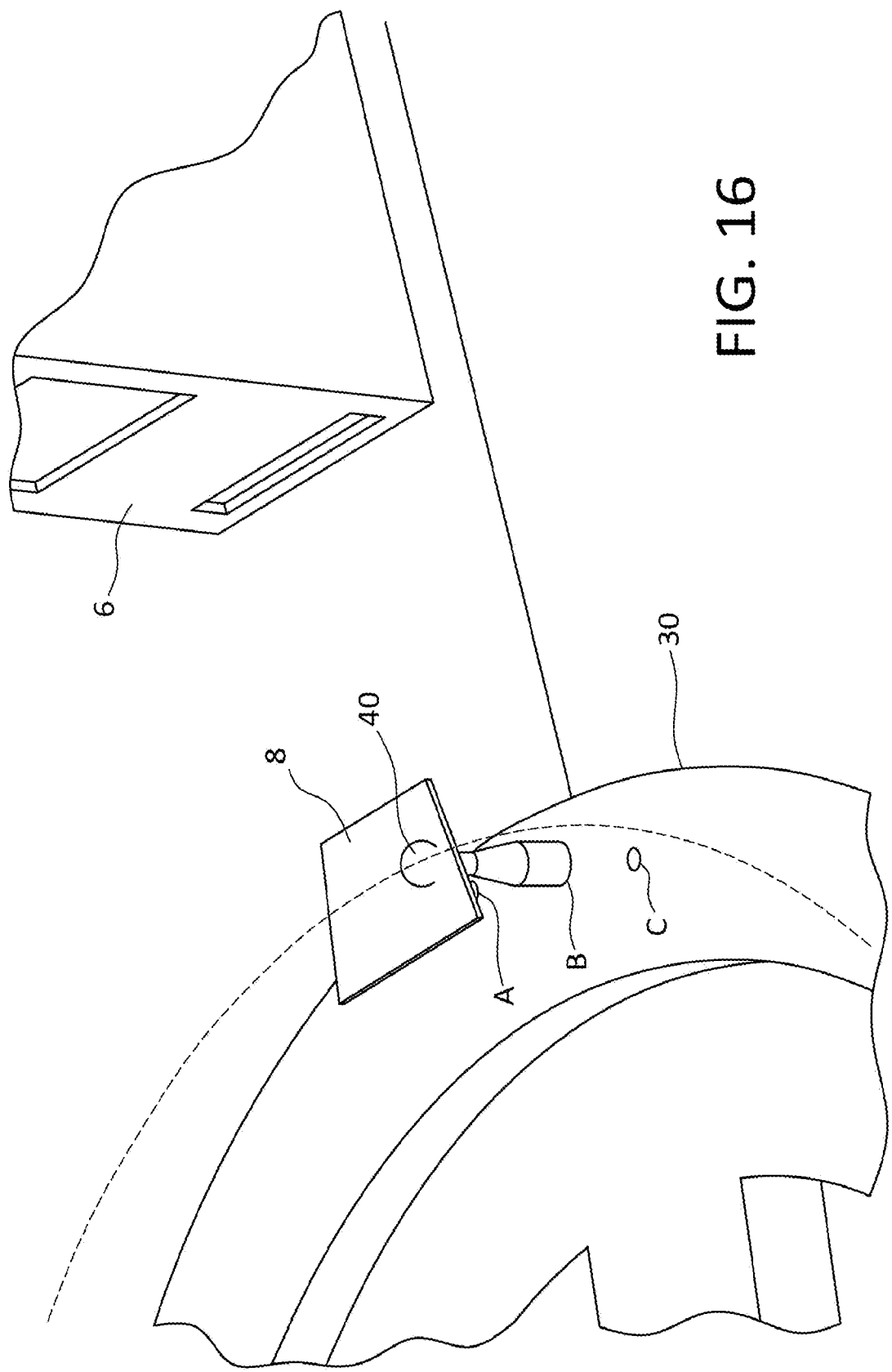
FIG. 16 shows a sphere located at another defined position on a calibration artifact as the sphere enters a field of view of a non-contact probe during calibration of the probe.
Figure 17:
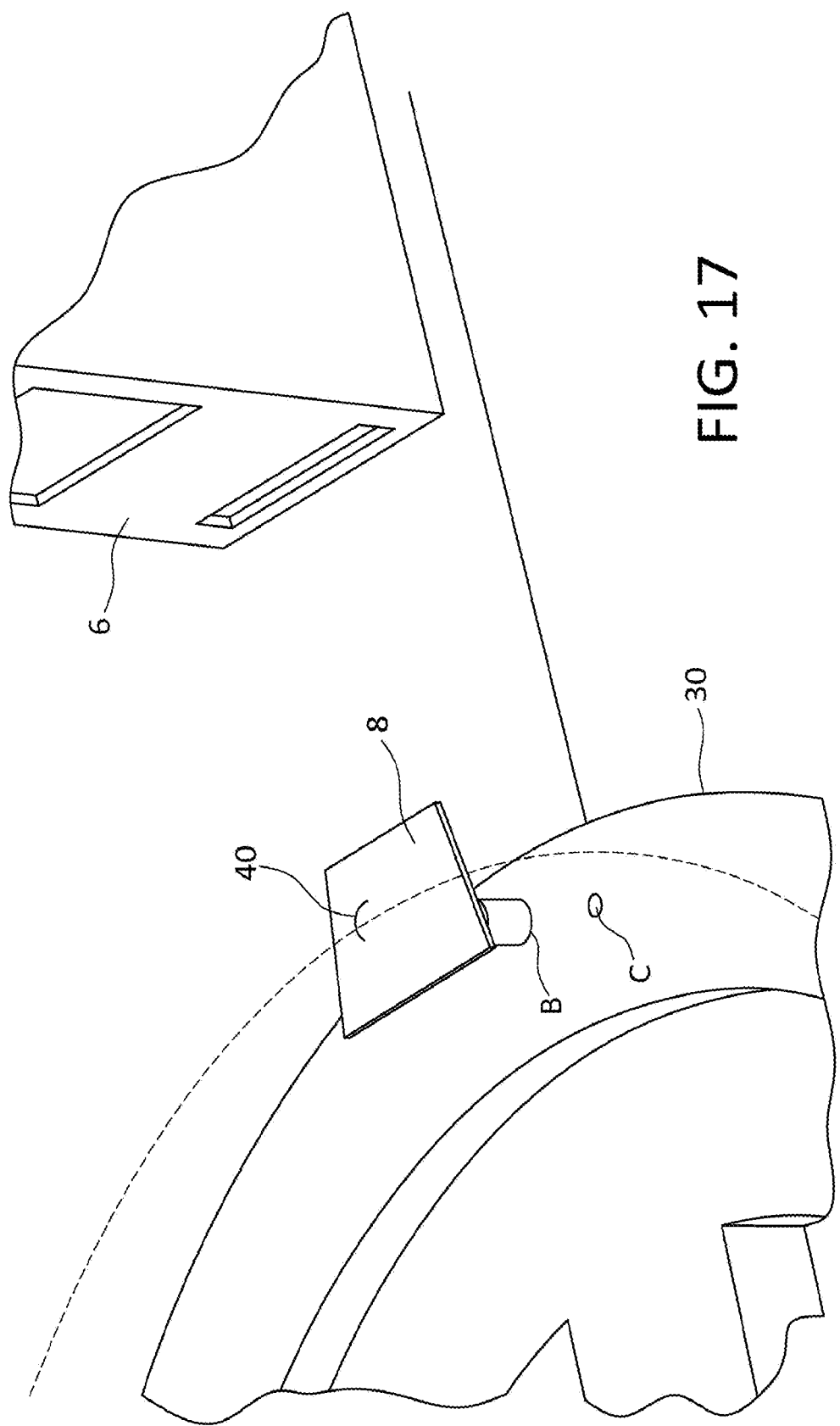
FIG. 17 shows the sphere of FIG. 16 as the sphere is near to leaving the field of view of the non-contact probe during calibration of the probe.

FIG. 16 shows a sphere 40 located at position B as the sphere enters the field of view 8 which is slightly tilted (see the tilted sensor 6 in FIG. 13). The dashed line represents the plane of the tilted field of view 8. FIG. 17 shows a sphere 40 located at position B that, due to rotation of the artifact 30, is located near the edge of the field of view 8 and is about to leave the field of view as rotation of the artifact about axis W continues. Because of the tilted field of view, the cross-section of the sphere passing through the field of view decreases as the sphere moves from entry to exit in the field of view 8. Note the amount of sphere 40 protruding above the field view 8 in FIG. 16 and FIG. 17.

It is also important to note that due to the difference in radial distance of locations of A and B on the artifact 30, sphere 40 passes through the field of view 8, in FIGS. 14-15 (location A), along a path located further to the right (as normally viewed in the drawings) than the path of sphere 40 in FIGS. 16-17 (location B).

Figure 18:
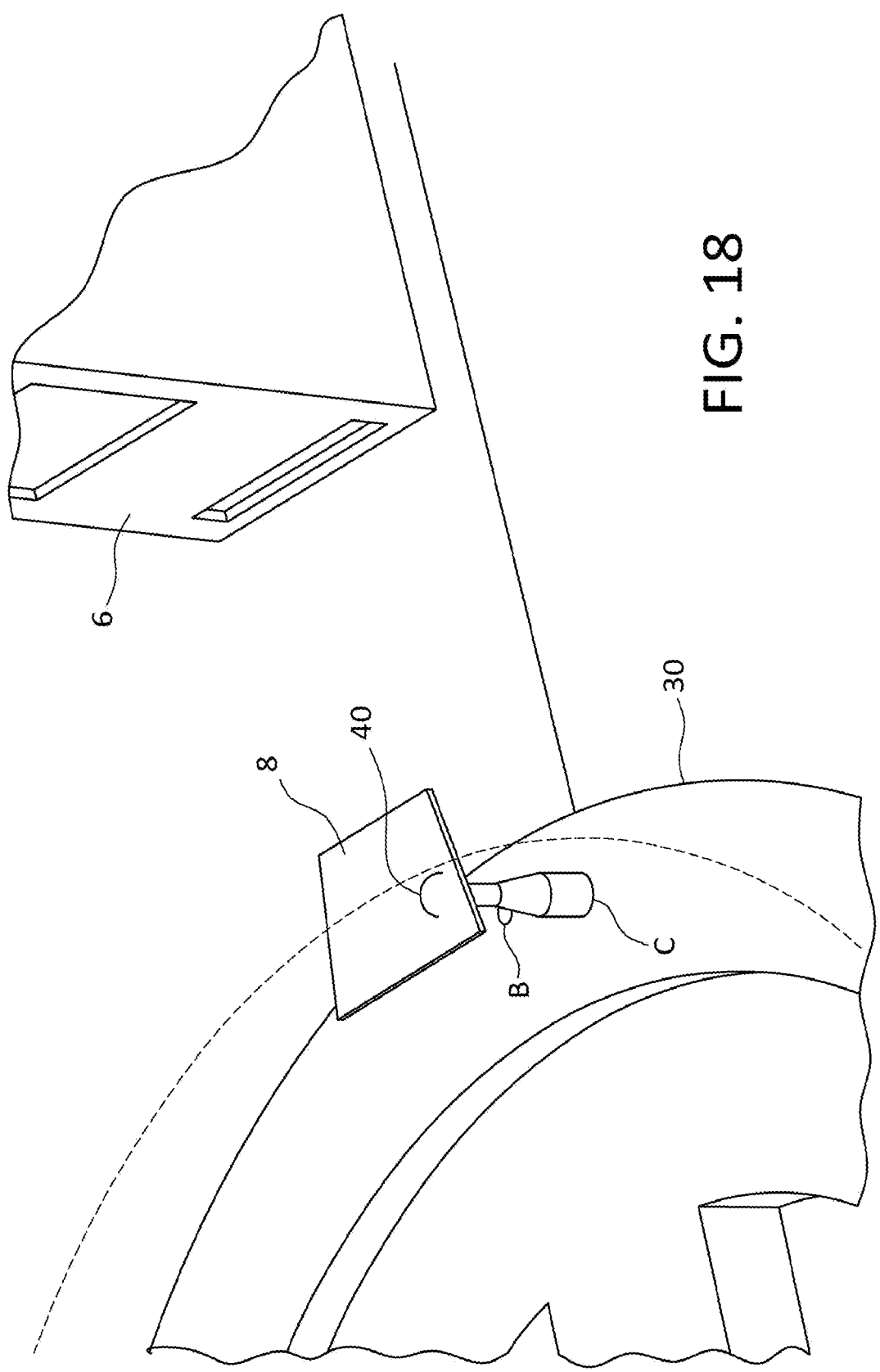
FIG. 18 shows a sphere located at yet another defined position on a calibration artifact as the sphere enters a field of view of a non-contact probe during calibration of the probe.
Figure 19:
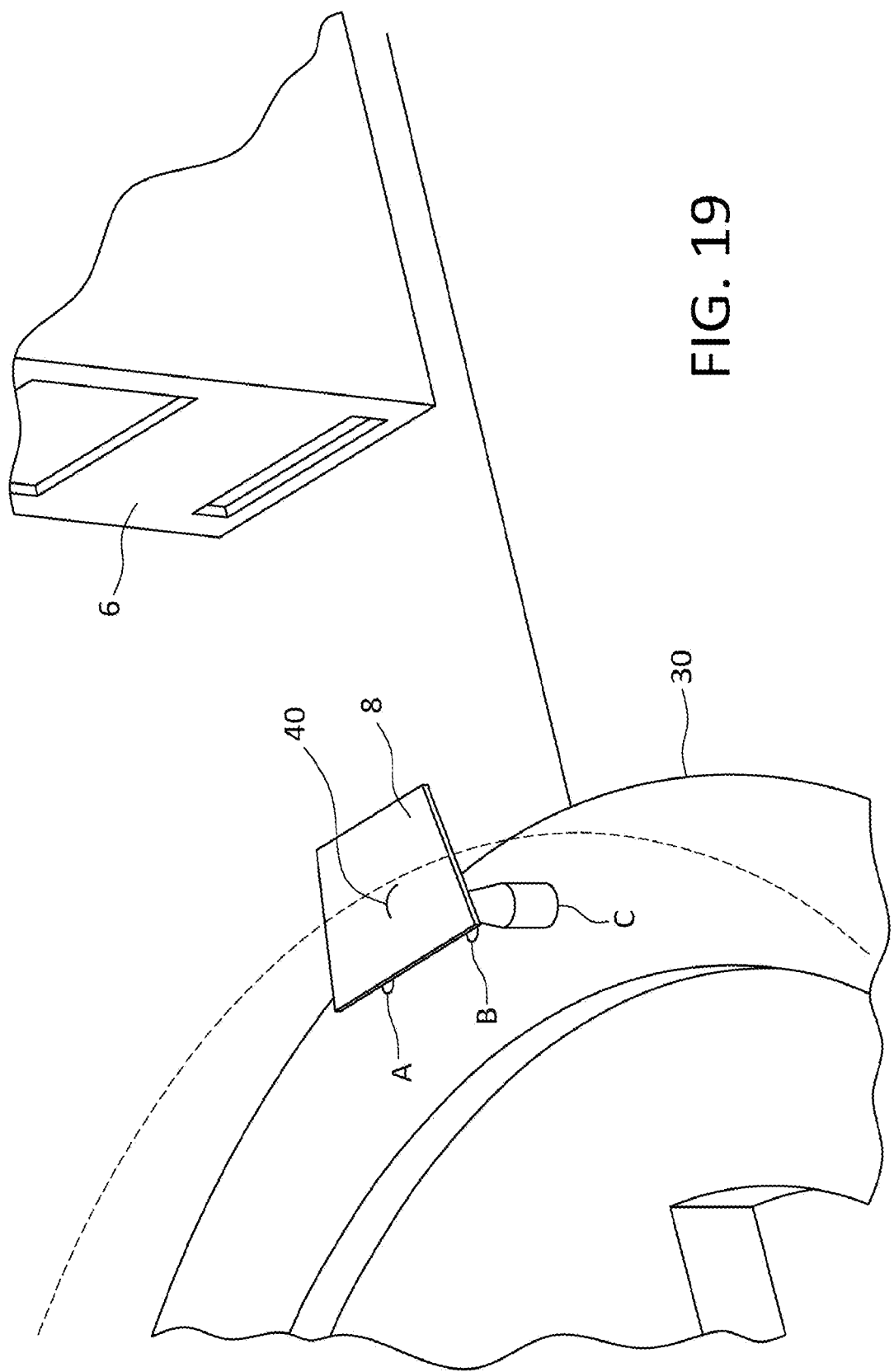
FIG. 19 shows the sphere of FIG. 18 as the sphere is near the middle of the field of view of the non-contact probe during calibration of the probe.

FIG. 18 shows a sphere 40 located at position C as the sphere enters the field of view 8 which is slightly tilted (see the tilted sensor 6 in FIG. 13). The dashed line represents the plane of the tilted field of view 8. FIG. 19 shows a sphere 40 located at position C that, due to rotation of the artifact 30, is located near the middle of the field of view 8 as rotation of the artifact about axis W continues. Because of the tilted field of view, the cross-section of the sphere passing through the field of view decreases as the sphere moves from entry toward exit in the field of view 8. Note the amount of sphere 40 protruding above the field view 8 in FIG. 19 and FIG. 19.

It is also important to note that due to the difference in radial distance of locations of B and C on the artifact 30, sphere 40 passes through the field of view 8, in FIGS. 16-17 (location B), along a path located further to the right (as normally viewed in the drawings) than the path of sphere 40 in FIGS. 18-19 (location C).

The calibration method steps comprise the following:

The calibration artifact is mounted on the machine.

The machine axis rotates so that calibration artifact moves relative to the sensor probe (e.g. laser) such that the calibration spheres pass through the probe's (sensor) field of view. Each calibration sphere passes through a different region in the probe's field of view. During this step, the machine collects axis position and probe sensor data at multiple points along the travel. This may be done while the axis is moving (known as scanning) or by moving and stopping at multiple positions and taking data while stationary.

Calibration parameters are determined from the axis position data, probe data and the deviation of the collected data with respect to the known geometry of the calibration artifact. Probe calibration parameters may include one or more of the following:

Offset

Direction

Scale

Skew

The invention may be used even if a machine is equipped with axes capable of three-dimensional (3D) positioning of a probe. The method may still be performed as described previously while the 3D positioning system is stationary (or without significant movement). For example, the invention may be useful under any one of the following circumstances:

The travel of the axes is restricted or insufficient.

The axes are not of sufficient accuracy to produce calibration results of the required accuracy.

Figure 2:
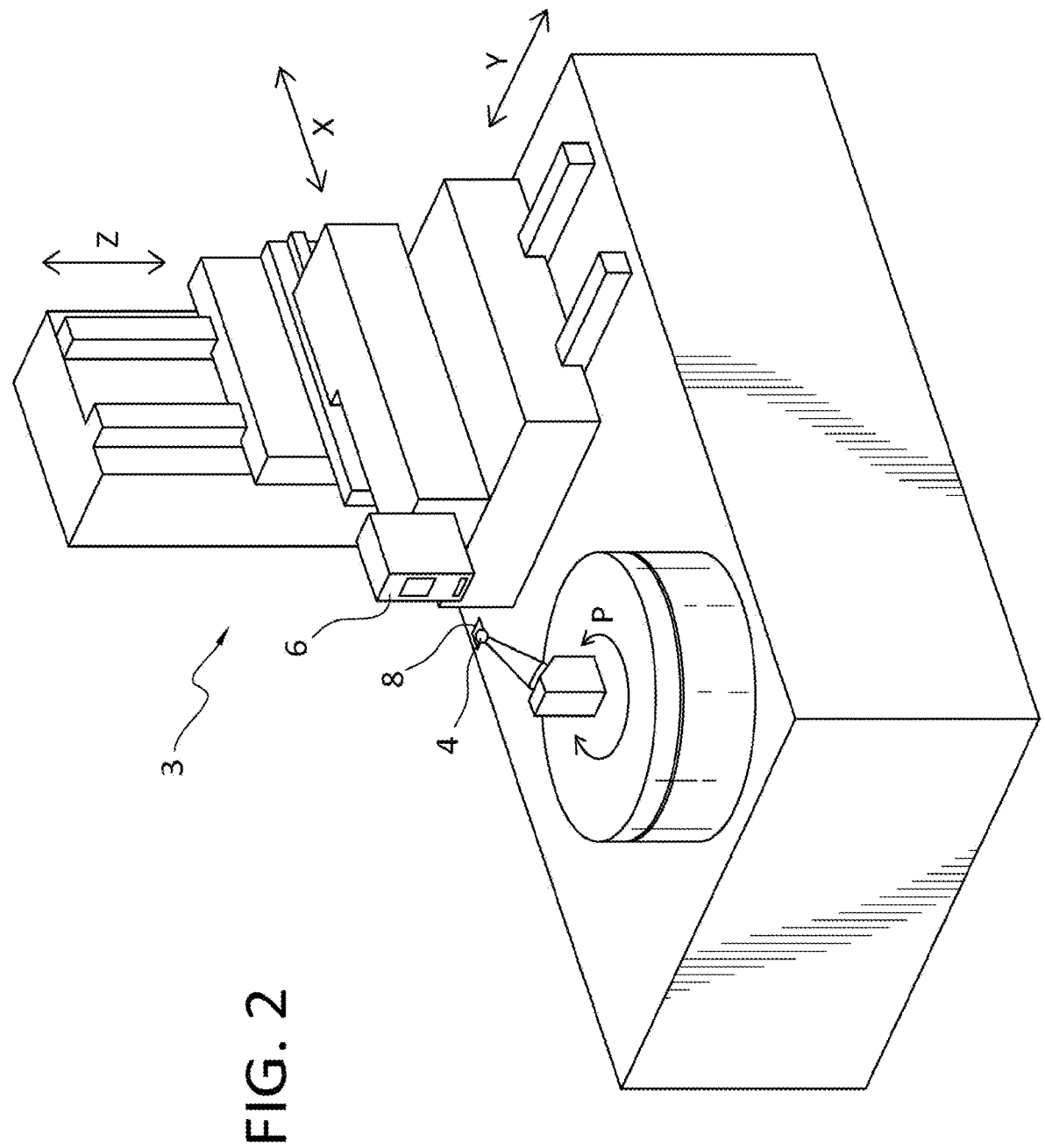
FIG. 2 is a schematic representation of a multi-axis CMM and GMM equipped with a non-contact probe and a single sphere (known as the calibration sphere) as a reference for determining the probe calibration parameters.
Figure 3:
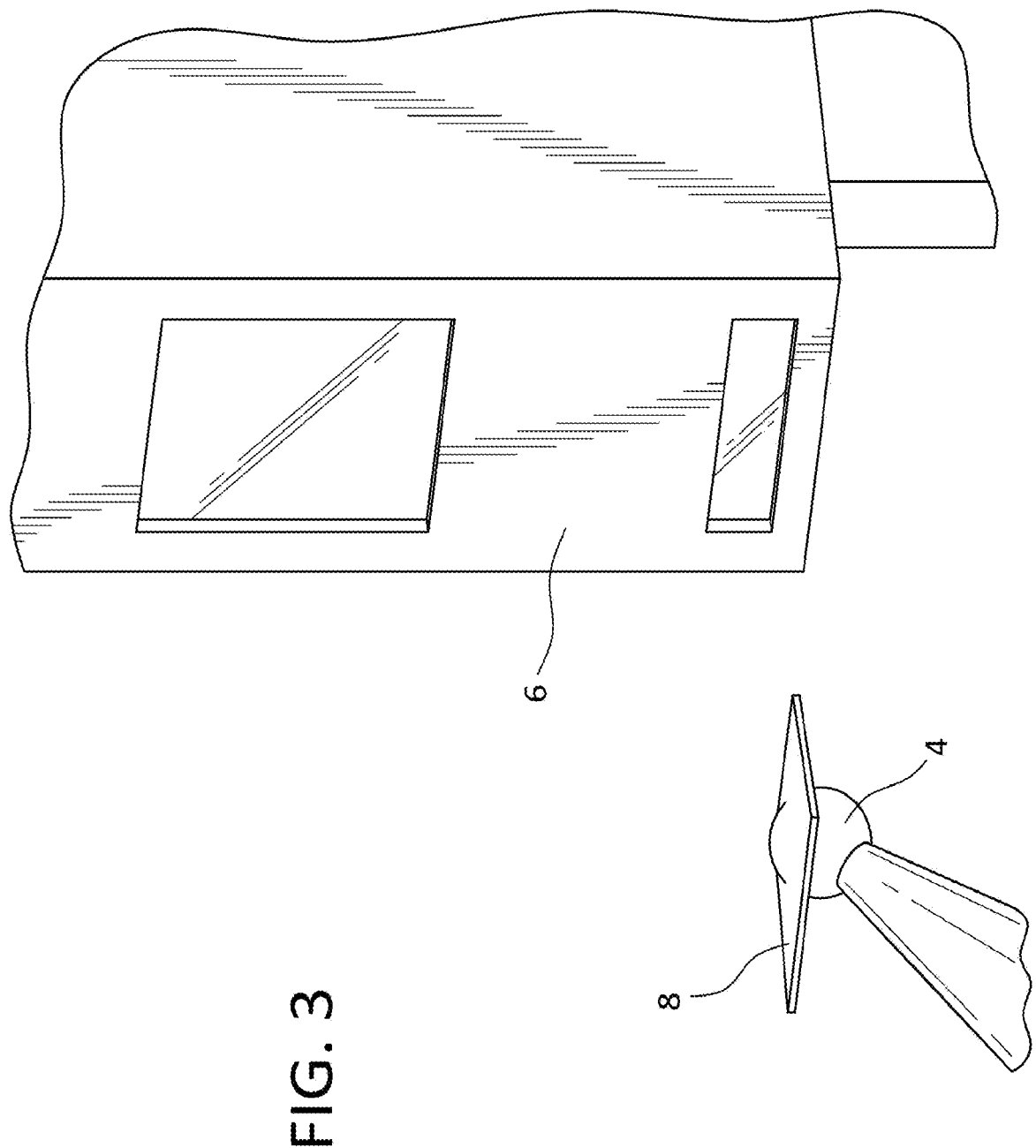
FIG. 3 shows a calibration sphere occupying a region in the field of view of the probe during calibration of the non-contact probe of the machine of FIG. 2.
Figure 4:
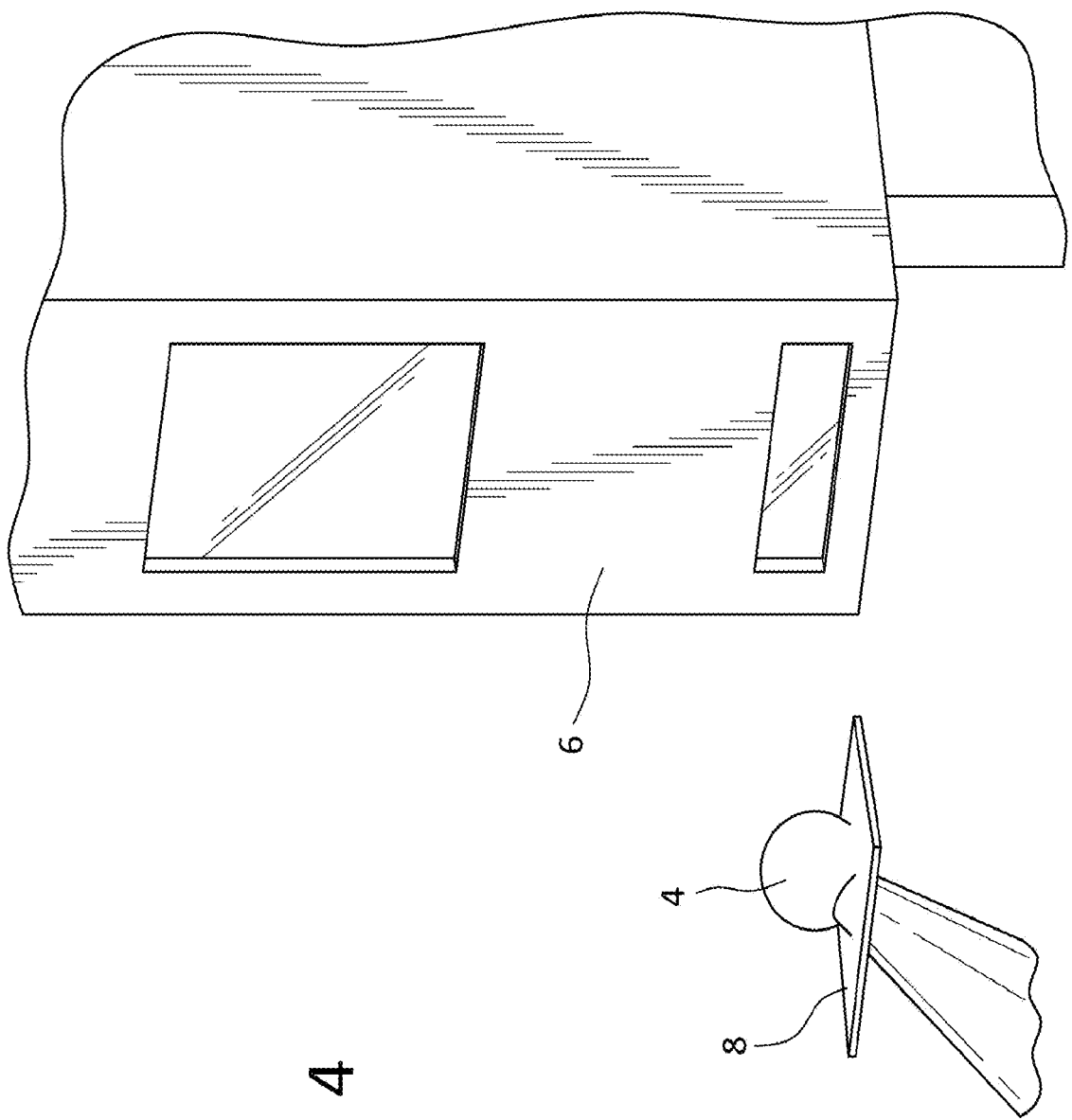
FIG. 4 shows a calibration sphere occupying another region in the field of view of the probe during calibration of the non-contact probe of the machine of FIG. 2.
Figure 5:
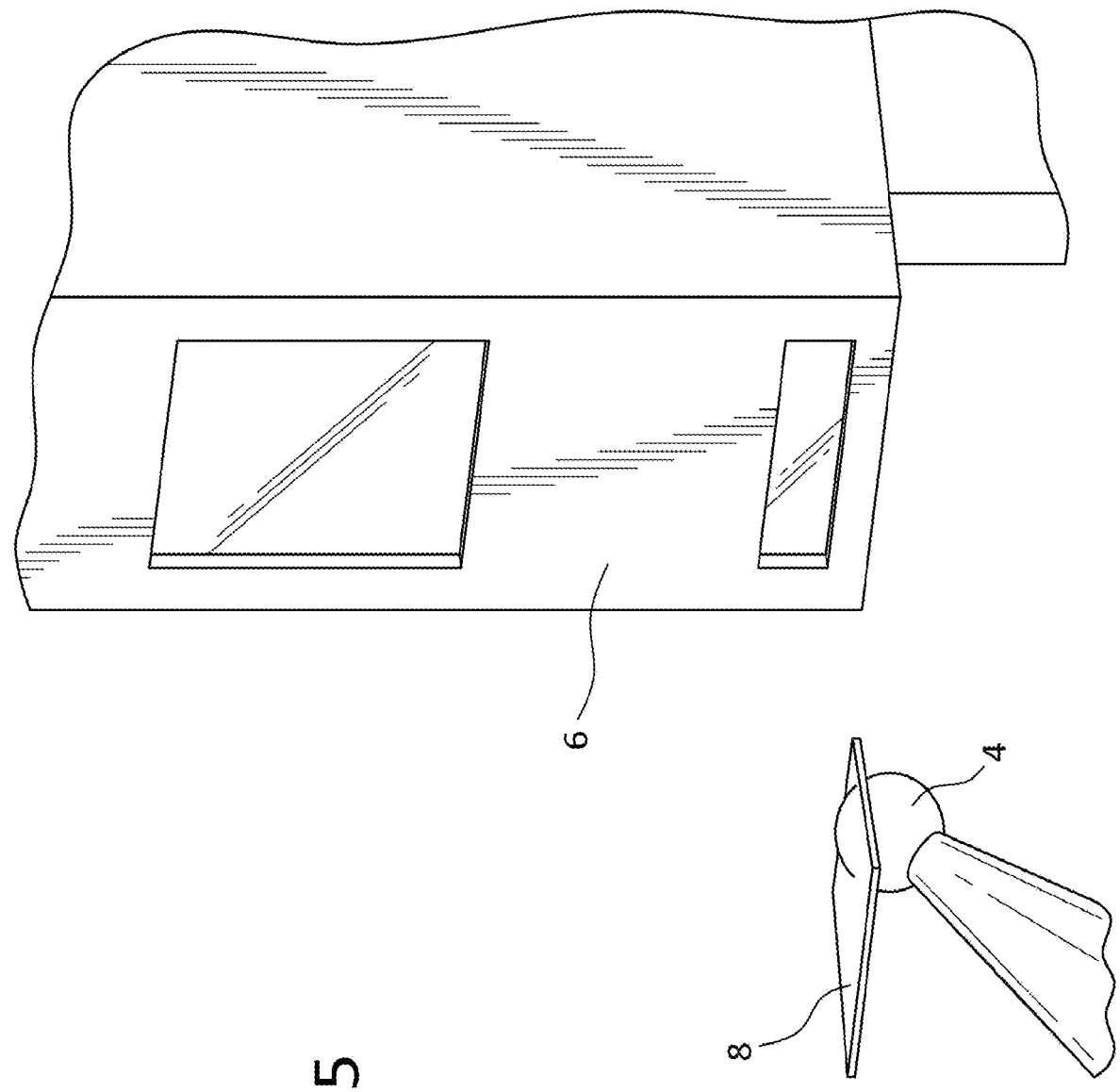
FIG. 5 shows a calibration sphere occupying yet another region in the field of view of the probe during calibration of the non-contact probe of the machine of FIG. 2.
Figure 6:
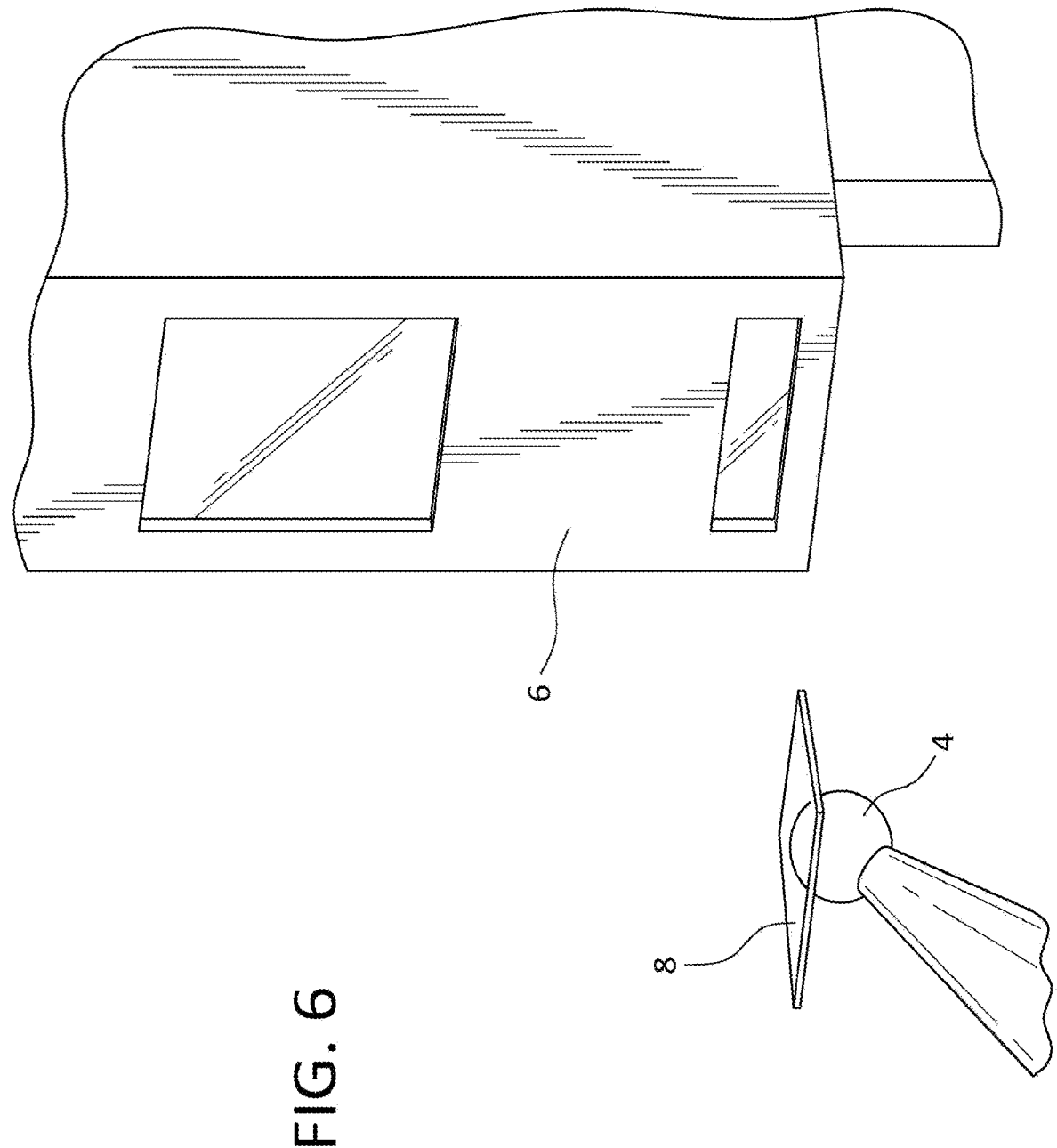
FIG. 6 shows a calibration sphere occupying still another region in the field of view of the probe during calibration of the non-contact probe of the machine of FIG. 2.

The time required to perform the method is less than alternatives. For example, laser calibration on a machine of the type as shown in FIG. 2, for example, using single sphere may take about 120 seconds or more for one position. The invented method takes about 55 seconds for calibration.

Figure 20:
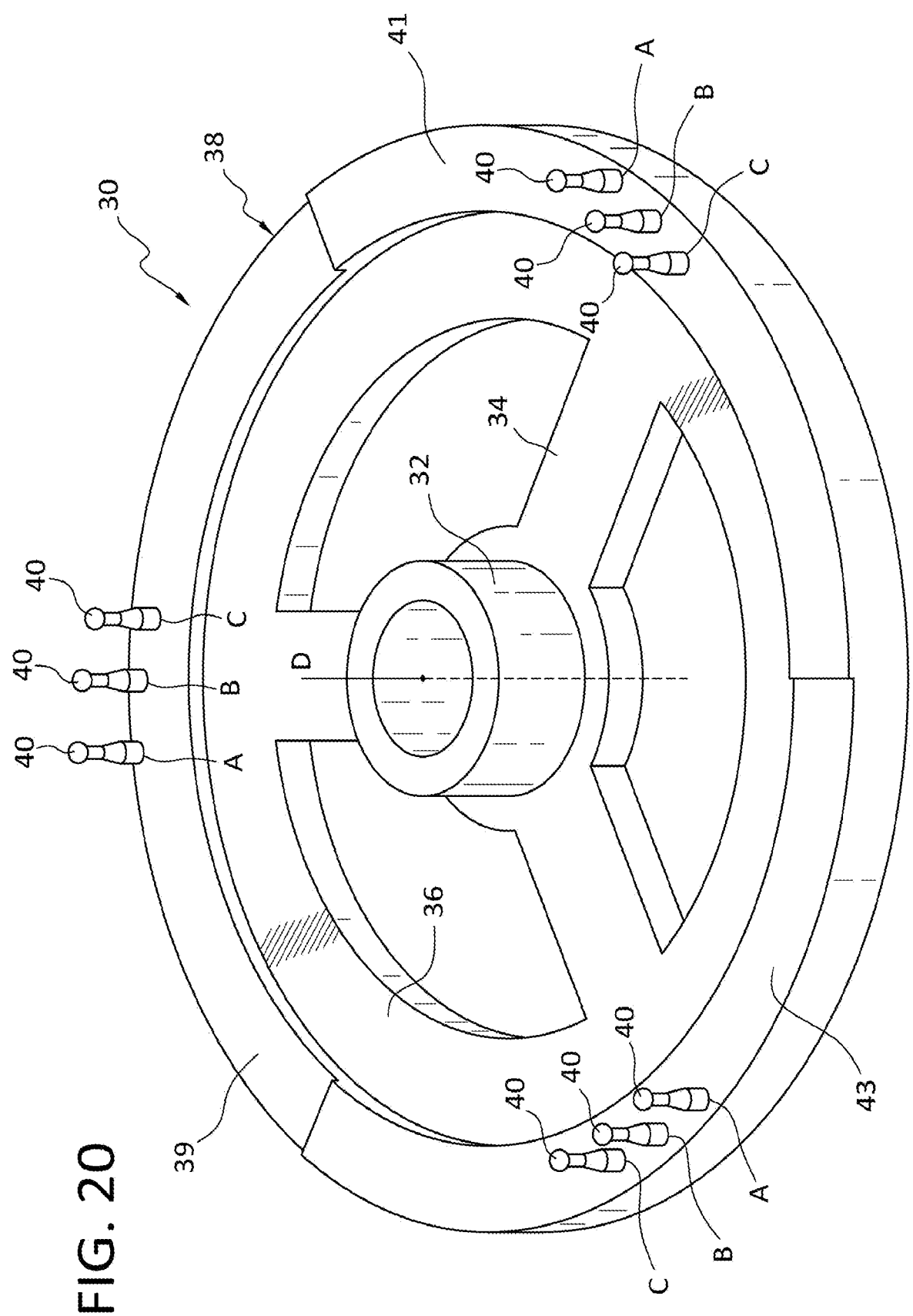
FIG. 20 illustrates a calibration sphere including multiple calibration spheres held at a similar radius and axial positions.

FIG. 20 shows a calibration artifact 30 including multiple calibration spheres 40 held at a similar radius (A, B, C) and axial positions (39, 41, 43) as discussed above. With this arrangement, the eccentricity and/or tilt of the artifact 30 may be determined in addition to the calibration parameters previously described. As an example, eccentricity and/or tilt of the artifact 30 may be determined by comparing all position "A" spheres to one another and/or comparing all position "B" spheres to one another and/or comparing all position "C" spheres to one another. While a sphere 40 is shown at all radial positions A, B and C, the minimum number of spheres 40 for determining eccentricity and tilt would be for one sphere at each of the A, B, or C positions. Thus, in FIG. 20 for example, spheres 40 at each "A" position would be sufficient for determining eccentricity and tilt. The eccentricity and tilt can be used to compensate the measurement of a similarly mounted workpiece.

FIGS. 21-25 illustrate another embodiment of the invention where a machine 68 includes an axis M which is used as a translational (e.g. linear) movement axis for a non-contact sensor 77 (e.g. laser) and its associated field of view 78. The calibration artifact 70 consists of multiple calibration spheres 72 held at a small offsets 74 from a line parallel to the movement axis M. Artifact 70 comprises two flat surfaces 71, 73 although additional offset surfaces may be included. The calibration spheres 72 may be grouped or arranged in the same pattern on surfaces 71 and 73 and may be closely spaced so that multiple spheres may be in the field of view 78 at the same time. Alternatively, artifact 70 may be flat with the calibration spheres 72 in one group positioned at a different height above the surface of the artifact 70 than the spheres of any other group.

Figure 21:
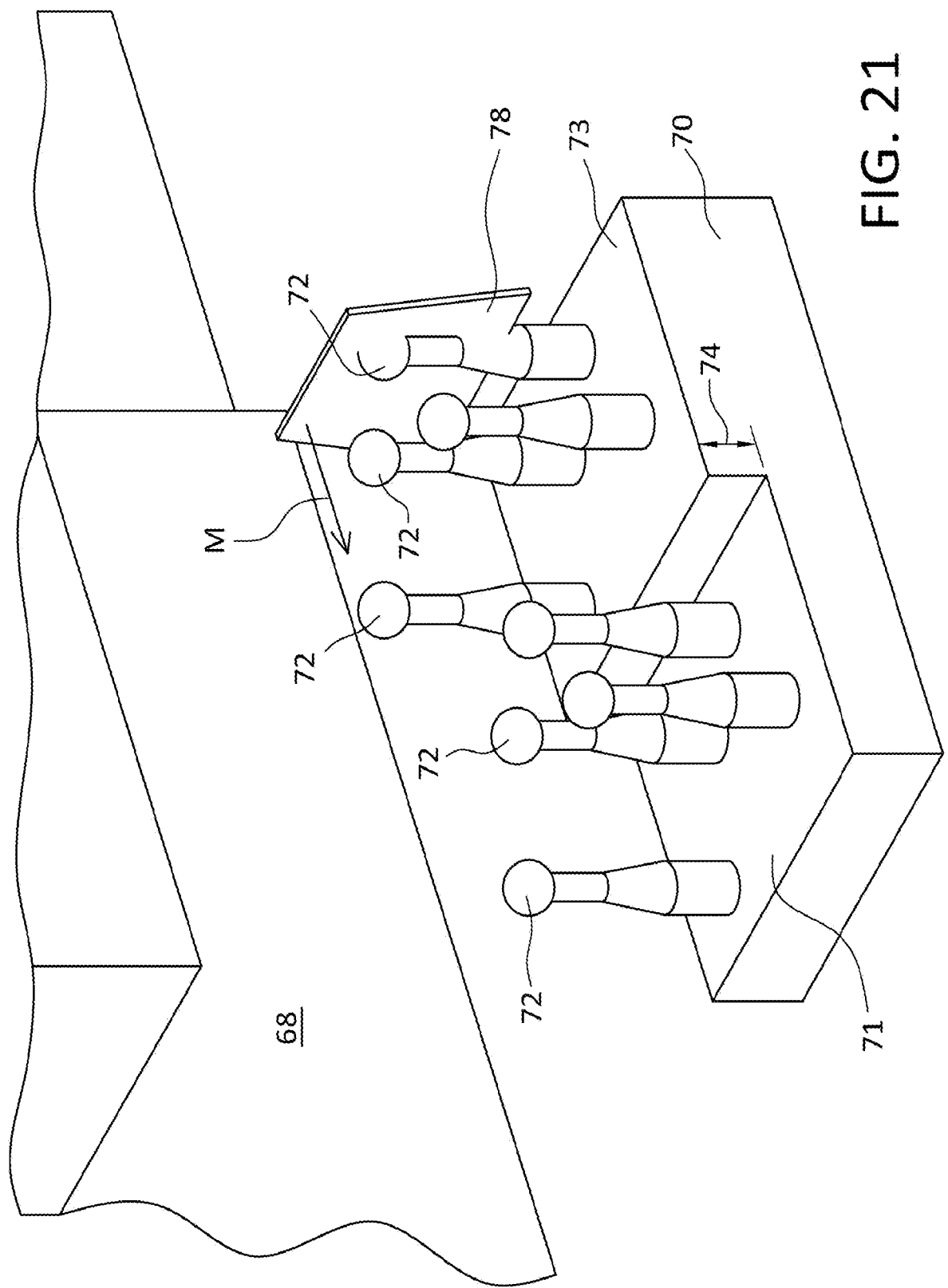
FIG. 21 illustrates an alternative embodiment of a calibration artifact and sensor arrangement for translational movement and comprising multiple calibration spheres held at a small offsets. The field of view is shown at its initial contact with a sphere of the artifact.
Figure 22:
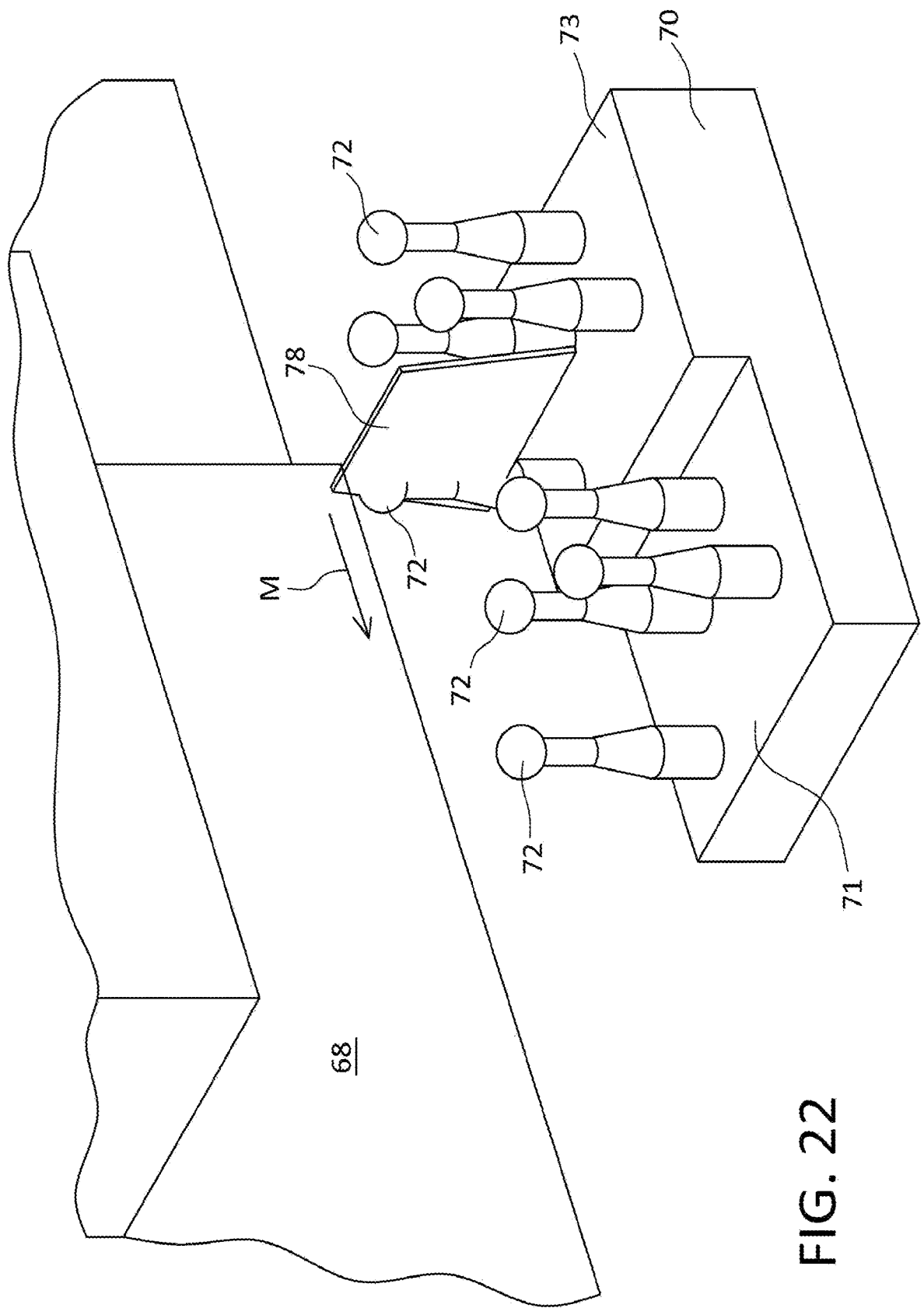
FIG. 22 shows the embodiment of FIG. 21 with the field of view contacting the final sphere near the inner end of a first flat surface portion of the artifact.
Figure 23:
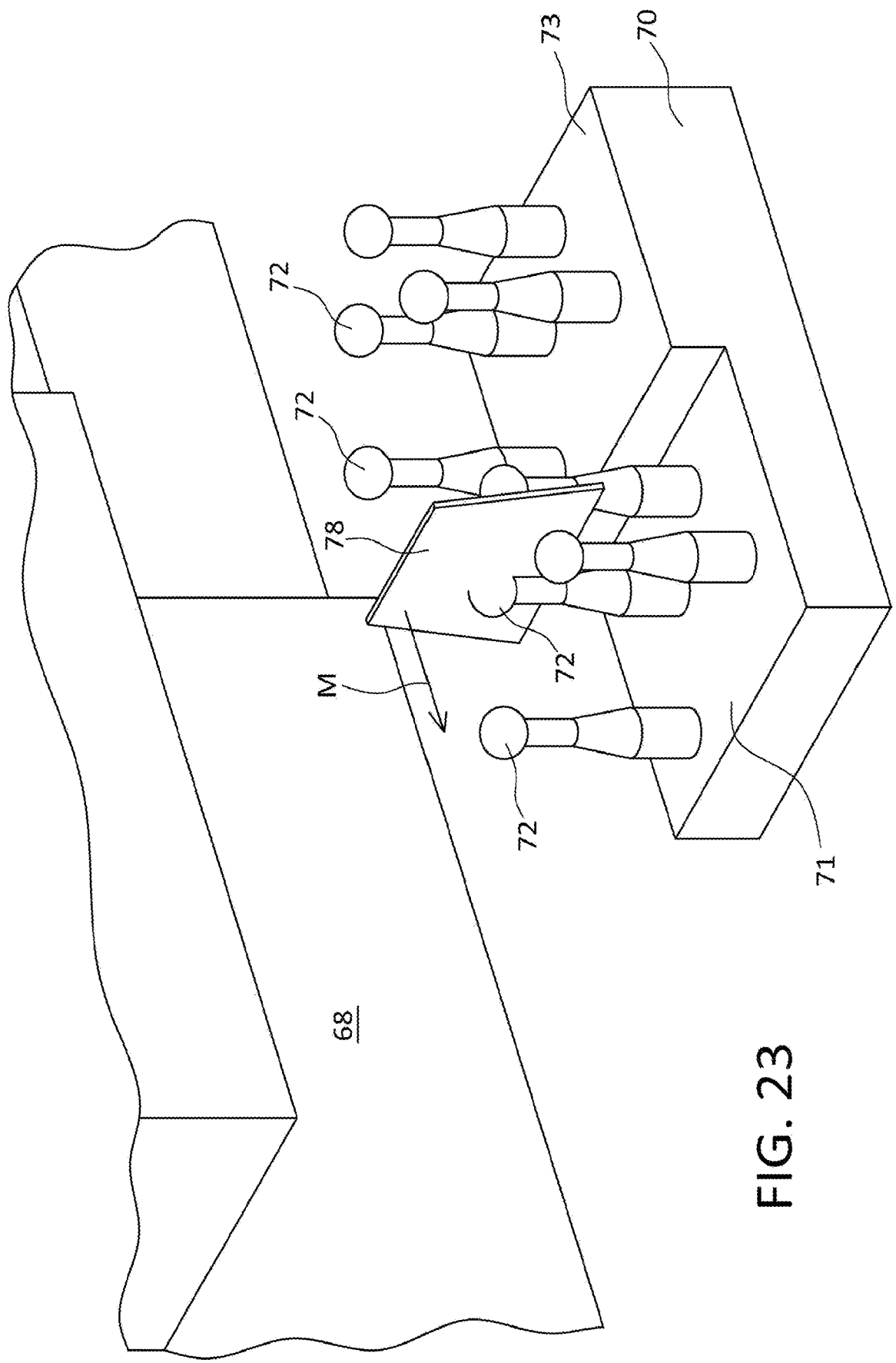
FIG. 23 shows the embodiment of FIG. 21 with the field of view contacting a sphere near the middle of a subsequent flat surface portion of the artifact.
Figure 24:
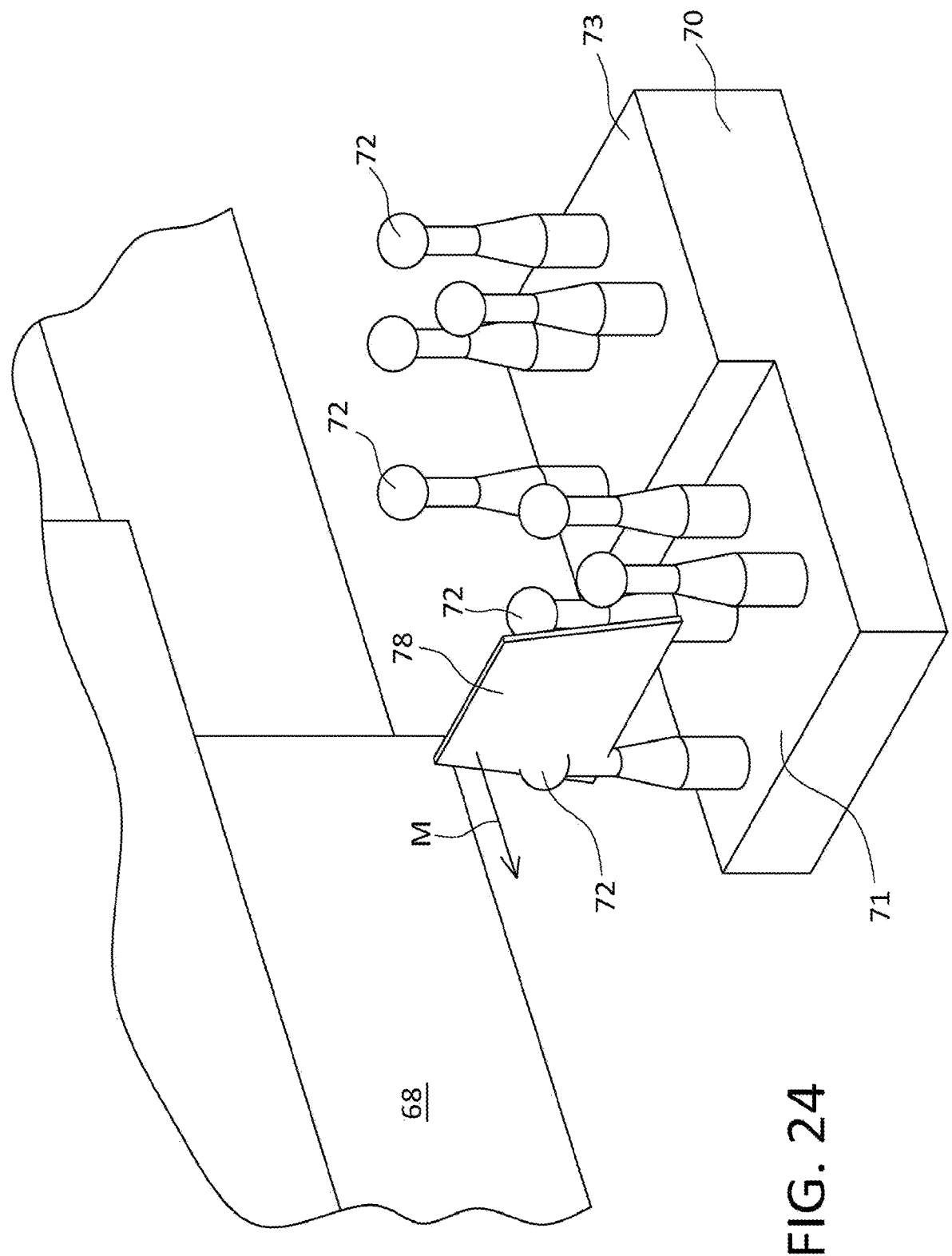
FIG. 24 shows the embodiment of FIG. 21 with the field of view contacting the final sphere near the outer end of the subsequent flat surface portion of the artifact.

FIGS. 21-24 show examples of movement of the field of view 78 relative to the artifact 70 and spheres 72 (right to left in FIGS. 21-24 as normally viewed) in direction M. FIG. 21 shows the field of view 78 at its initial contact with a sphere 72 of the artifact 70. FIG. 22 shows the field of view 78 contacting the final sphere near the inner end of a first flat surface portion 73 of the artifact 70. FIG. 23 shows the field of view 78 contacting a sphere near the middle of a subsequent flat surface portion 71 of the artifact 70. FIG. 24 shows the field of view 78 contacting the final sphere near the outer end of the subsequent flat surface portion 71 of the artifact 70.

Figure 25:
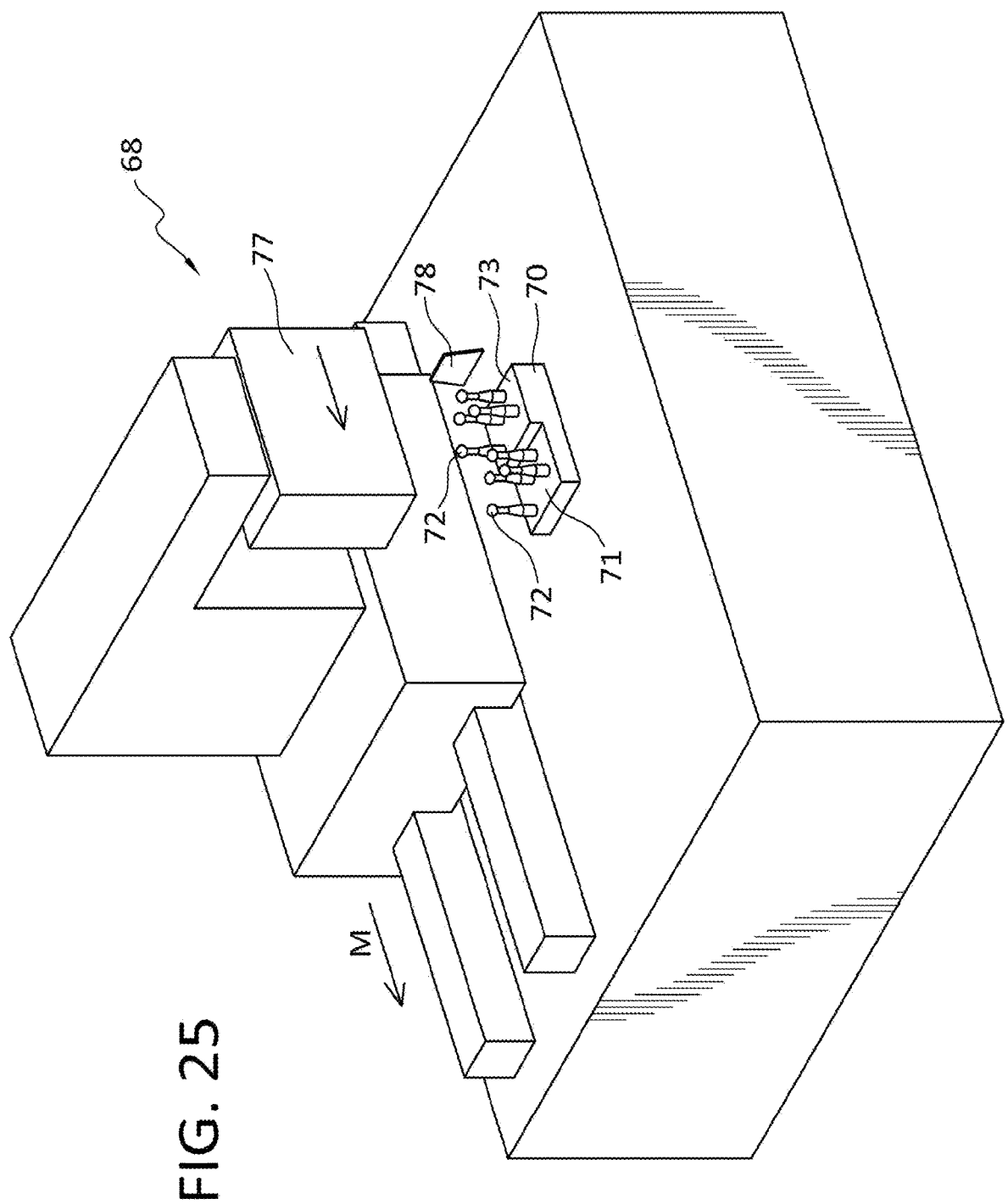
FIG. 25 shows a schematic view of a mechanism for moving a non-contact sensor and its associated field of view relative to the alternative embodiment artifact of FIG. 21.

Data may be collected (e.g. axis position and probe data) while continually moving along the axis M (known as scanning) or by moving and stopping at multiple positions and taking data while stationary. FIG. 25 shows a schematic view of a mechanism for moving a non-contact sensor 77 (e.g. laser) and its associated field of view 78 relative to an artifact 70 comprising multiple spheres 72 arranged on a plurality of flat surfaces located at different heights relative to the sensor 77 and the field of view 78.

The calibration artifact 70 may comprise a plurality of spheres wherein each sphere is mounted and probed as described above in turn via a precision mounting system (such as a kinematic mount). Each sphere (or group thereof) is probed in turn after mounting. The data collected for each may then be used together to determine the calibration parameters. Using such a mounting system, a single calibration sphere may be used, probed multiple times, and then mounted in a different location.

It should be understood that the invention additionally contemplates a calibration artifact as described above but using pins or cylinders, involute helicoid or other geometric shapes instead of or in addition to spheres.

The invention may be performed simultaneously (in parallel) or successively with multiple sensors thereby enabling the calibration of each sensor accurately in relation to every other sensor. This allows the data collected by multiple probes to be combined and used together accurately (e.g. measuring the relationship between two features measured by separate probes).

The invention further comprises the utilization of two axes capable of positioning on a 2D surface.

While the invention has been described with reference to preferred embodiments it is to be understood that the invention is not limited to the particulars thereof. The present invention is intended to include modifications not specifically detailed herein which would be apparent to those skilled in the art to which the subject matter pertains without deviating from the spirit and scope of the appended claims.

What is claimed is:

1. A calibration artifact for a machine having a laser sensor with an associated field of view, said calibration artifact comprising:
    said calibration artifact being rotatable about an axis of rotation of said machine or linearly translatable in a direction on said machine, said calibration artifact comprising a top side,
    said calibration artifact comprising a plurality of shaped calibration surfaces, said calibration surfaces being arranged on at least one surface on the top side of the calibration artifact,
    said calibration surfaces being arranged at different locations on said at least one top surface with respect to the field of view of said laser sensor.

2. The calibration artifact of claim 1 wherein the artifact is circular in shape and is rotatable about an axis of rotation.

3. The calibration artifact of claim 2 wherein the artifact further includes an outer circumferential face portion on the top side with the outer circumferential face portion being located radially outward from the artifact axis of rotation and adjacent to a periphery of the artifact.

4. The calibration artifact of claim 3 wherein said plurality of calibration surfaces are arranged on said outer circumferential face portion.

5. The calibration artifact of claim 4 wherein a portion of the calibration surfaces are located at a radial distance from said axis of rotation or at an axial position with respect to said axis of rotation that is different than the radial distance or axial position of the remaining calibration surfaces.

6. The calibration artifact of claim 4 wherein said plurality of calibration surfaces comprises at least three groups of calibration surfaces being spaced circumferentially about the circumferential face portion.

7. The calibration artifact of claim 6 wherein said at least three groups of calibration surfaces are equidistantly spaced circumferentially about the circumferential face portion.

8. The calibration artifact of claim 6 wherein each of said at least three groups of calibration surfaces comprises a plurality of calibration surfaces.

9. The calibration artifact of claim 8 wherein each of said plurality of calibration surfaces in a group of calibration surfaces is positioned at a radial distance from said axis of rotation that is different than the radial distance position of the other calibration surfaces in the group.

10. The calibration artifact of claim 3 wherein the outer circumferential face portion comprises a plurality of stepped portions with each of the stepped portions being located at an axial position with respect to the axis of rotation of the artifact, wherein each of the stepped portions is located at a different axial position than the other stepped portions.

11. The calibration artifact of claim 10 wherein each of the stepped portions comprises a group of calibration surfaces.

12. The calibration artifact of claim 11 wherein each group of calibration surfaces comprises a plurality of calibration surfaces.

13. The calibration artifact of claim 12 wherein each of said plurality of calibration surfaces in a group of calibration surfaces is positioned at a radial distance from said axis of rotation that is different than the radial distance position of the other calibration surfaces in the group.

14. The calibration artifact of claim 11 wherein the plurality of calibration surfaces in each group is the same number of calibration surfaces.

15. The calibration artifact of claim 14 wherein each group comprises at least three calibration surfaces wherein a first calibration surface in each group being located at a radial position A with respect to the axis of rotation, a second calibration surface in each group being located at a radial position B with respect to the axis of rotation, and a third calibration surface in each group being located at a radial position C with respect to the axis of rotation, with the radial positions A, B and C being different from one another.

16. The calibration artifact of claim 1 wherein the calibration surface comprises a sphere.

17. The calibration artifact of claim 1 wherein the calibration surface is positioned on one end of a pin or post with the other end of the pin or post being attached to the top side thereby spacing the calibration surface from the top side.

18. A method of calibrating a gear inspection machine having a laser sensor with an associated field of view, said method comprising:
positioning a calibration artifact on said machine, said calibration artifact being rotatable about an axis of rotation of said machine or linearly translatable in a direction on said machine, said calibration artifact comprising a top side, said calibration artifact comprising a plurality of shaped calibration surfaces, said calibration surfaces being arranged on at least one surface on the top side of the calibration artifact, said calibration surfaces being arranged at different locations on said at least one top surface with respect to the field of view of said laser sensor,
activating said sensor to produce said field of view,
moving said calibration artifact relative to said field of view and passing the calibration surfaces through said field of view,
collecting machine axis and sensor data during passing of the calibration surface through said field of view,
comparing the collected machine axis and sensor data for respective calibration surfaces to known machine axis and sensor data for the respective calibration surfaces,
calibrating the machine based on the difference between the collected and known machine axis and sensor data.

19. The method of claim 18 wherein movement along or about one machine is necessary to carry out said method.

20. A gear inspection machine having a laser sensor with an associated field of view, said machine comprising at least one of a workpiece axis of rotation and a workpiece linear axis of motion whereby a workpiece is movable relative to and through said field of view, said machine further comprising:
a calibration artifact positioned on said machine in a same manner as a workpiece positioned on said machine, said calibration artifact being movable relative to and through the flied of view via rotation of the calibration artifact about the machine workpiece axis of rotation or via linear translation relative to and through the flied of view via the machine workpiece linear axis of motion.

* * * * *